US012798461B2

(12) United States Patent
Heeg et al.

(10) Patent No.: US 12,798,461 B2
(45) Date of Patent: Nov. 17, 2026

(54) PLUG-IN UNIT, PLUG-IN CONNECTOR, SEAT ARRANGEMENT AND VEHICLE

(71) Applicant: Adient US LLC, Plymouth, MI (US)

(72) Inventors: Norbert Heeg, Dahn (DE); Arkadius Rock, Solingen (DE); Andrej Medved, Trencin (SK); Mark Thomas Prosch, Solingen (DE); Thomas Mayer, Radevormwald (DE)

(73) Assignee: Adient US LLC, Plymouth, MI (US)

( * ) Notice: Subject to any disclaimer, the term of this patent is extended or adjusted under 35 U.S.C. 154(b) by 262 days.

(21) Appl. No.: 18/532,171

(22) Filed: Dec. 7, 2023

(65) Prior Publication Data

US 2024/0190317 A1 Jun. 13, 2024

(30) Foreign Application Priority Data

Dec. 7, 2022 (DE) ..................... 10 2022 213 228.9
Mar. 22, 2023 (DE) ..................... 10 2023 202 556.6

(51) Int. Cl.
*B60N 2/90* (2018.01)
*H01R 13/629* (2006.01)

(52) U.S. Cl.
CPC ......... *B60N 2/90* (2018.02); *H01R 13/62938* (2013.01); *H01R 2201/26* (2013.01)

(58) Field of Classification Search
CPC .......... B60N 2/90; B60N 2/0264; B60N 2/01; B60N 2/0155; B60N 2/919; H01R 13/62938; H01R 2201/26
USPC ........................................................... 439/34
See application file for complete search history.

(56) References Cited

U.S. PATENT DOCUMENTS

2015/0298586 A1 10/2015 Rothstein et al.
2021/0078510 A1* 3/2021 Line ..................... B60N 2/0705
2021/0129778 A1 5/2021 Banares et al.

FOREIGN PATENT DOCUMENTS

DE 102012017299 A1 5/2014
DE 102020123902 A1 3/2021
DE 102022206128 A1 6/2023
EP 0909676 A2 4/1999
JP 2007112174 A 5/2007
WO WO-2023105424 A1 * 6/2023 ......... B60N 2/01583

OTHER PUBLICATIONS

European Patent Office, Office Action in Application No. DE 10 2023 202 556.6, dated Aug. 28, 2023, 6 pages.
China National Intellectual Property Administration, Office Action in Application No. CN202311674455.7 dated Sep. 11, 2026, 10 pages, with English Translation of pages of 3-4.

* cited by examiner

*Primary Examiner* — Abdullah A Riyami
*Assistant Examiner* — Amara Anderson
(74) *Attorney, Agent, or Firm* — Marshall & Melhorn, LLC

(57) ABSTRACT

A plug-in unit for a plug-in connector, the plug-in unit may have a housing, a plug with a number of plug-in contacts, a triggering unit and a drive unit. The triggering unit unblocking or releasing the drive unit upon triggering, with the result that the plug, driven by the drive unit, is movable relative to the housing from a rest position into a plug-in position. The plug-in connector may be used with a seat arrangement and a vehicle.

17 Claims, 15 Drawing Sheets

PLUG-IN UNIT, PLUG-IN CONNECTOR, SEAT ARRANGEMENT AND VEHICLE

FIELD

The invention relates to a plug-in unit for a plug-in connector, a plug-in connector for a seat arrangement, a seat arrangement with one seat or a plurality of seats, and a vehicle with at least one seat arrangement.

BACKGROUND

Seats in vehicles are usually connected fixedly to the vehicle. They are installed as non-removable seats. In order to improve the variability of vehicles, in particular of vans, the seats are increasingly designed in such a way that they can be removed by the user. The seats have different electrical functions such as heating, ventilation, belt tensioners or the like. In order to supply these functions with current and/or information, these seats have an electrical connector. An installation or removal of seats of this type with an electrical connector is highly complex for the user on account of a large number of required manipulations. Currently, for example, the electrical connections are established manually by hand by means of plug-in connectors, that is to say the user plugs and presses an electrical plug into a socket until a locking means locks the plug. The positioning of these plug types always takes place manually by way of the user or the operator. Releasing or plugging of the plug usually takes place rarely, in particular less than ten times during the service life of the seat arrangement, for example mainly on account of maintenance. The previous application DE 10 2022 206 128 A1 has disclosed a plug which is holdable in a withdrawn position by way of a locking cam. DE 10 2020 123 902 A1 has disclosed a guide track assembly with an electrical connector.

SUMMARY

The invention is based on the problem of providing an improved plug-in unit for a plug-in connector, a plug-in connector with an improved plug-in unit of this type, and a seat arrangement with an improved plug-in unit of this type, and a vehicle with at least one seat arrangement of this type.

According to the invention, the first-mentioned problem is solved by way of a plug-in unit, the second-mentioned problem is solved by way of a seat arrangement, the third-mentioned problem is solved by way of a vehicle with the features of the claims described herein.

The plug-in unit according to the invention comprises at least a housing, a plug with a number of plug-in contacts, a triggering unit and a drive unit, the triggering unit being mounted movably on the housing and unblocking the drive unit upon triggering, with the result that the plug, driven by the drive unit, is movable relative to the housing from a rest position (also called an open or opening position) into a plug-in position (also called a contacting position). The plug preferably makes contact with a corresponding socket automatically. The plug-in unit is a separate configuration. The plug-in unit is configured, in particular, as a mounting module. In other words: the plug-in unit is of modular construction. The housing, the plug, the triggering unit and the drive unit of the plug-in unit form the mounting module in an assembled state.

The plug-in connector is configured as an electrical plug-in connector. The plug-in connector is also called a contacting apparatus.

The triggering unit (also called a blocking unit) can be configured, for example, in such a way that, upon triggering, it is actuable into a triggering position (also called an unblocking position), as a result of which the drive unit is unblocked (also called activated or released), which drive unit in turn brings about a plug-in movement of the plug. The triggering unit can be coupled, for example, to a seat locking means of a seat arrangement. In addition, a restoring unit for the plug can be provided, which restoring unit is likewise coupled to the seat locking means.

In particular, the triggering unit can be arranged movably, in particular pivotably, at an upper end of the housing.

The triggering unit can comprise, for example, at least one movable locking element (also called a blocking element) which, in a first position (also called a blocking position), blocks the drive unit and holds the plug in its rest position (also called a non-plugged position or open position) and, in a second position (also called a triggering position or unblocking position), unblocks the drive unit, in order, in particular, to release the drive unit and to adjust the plug out of the rest position into the plug-in position.

The locking element (also called a blocking element or fixing element) can be mounted on the housing, for example, pivotably about a pivot axis. The locking element can be actuable manually, for example. As an alternative or in addition, the locking element can be couplable to a seat locking means. For example, the locking element and the seat locking means can be coupled to one another in such a way that, in the case of an actuation of the seat locking means to lock the seat, the seat group or the seat bench, the locking element is automatically actuated, in particular is actuable into the second position (=triggering position or unblocking position), in order to automatically release the drive unit in the case of the actuation of the seat locking means and to adjust the plug out of the rest position into the plug-in position. In other words: if a seat, a seat group or a seat bench is set at the correct position in the vehicle and the seat locking means is actuated in order to fix the seat, the seat group or the seat bench, a plug-in connection of the plug-in unit to a complementary socket is establishable automatically. As an alternative, conversely in the case of an actuation of the locking means in order to unlock the seat, the seat group or the seat bench, the locking element can be automatically actuated in the reverse direction, in particular can be actuated into the first position (=blocking position), in order to block the drive unit when the plug is reset together with the drive unit out of the plug-in position into the rest position.

The locking element can be configured, for example, as an eccentric, for example an eccentric cam or an eccentric lever or a locking pin or the like. A configuration of the locking element as an eccentric makes a sufficiently great locking force with a small unlocking stroke possible. By means of a simple locking pin which is moved in a controlled manner, for example, by a mechanical locking system, in particular an easy mount system, a particularly simple and compact plug with a locking function is produced. The locking element is movable between a locking position (also called a blocking position or rest position), in which the plug is locked and not plugged, and a plug-in position (also called a release position or unlocking position), in which the plug is unlocked and released for making contact.

In addition, the locking element can be fixable by means of a spring in a predefined rotary angle position, in particular in a rest position or locking position. In particular, the locking element is fixable in a rotary angle position which corresponds to the set preload of the spring, in particular a preloading spring, in order to ensure the releasable locking of the drive unit.

For example, the locking element can comprise a blocking portion which engages in a blocking manner into a blocking opening of a slide in the first position of the locking element. The slide can be movement-coupled to the drive unit, for example. In particular, the slide can be mounted and guided movably in the housing. For example, the plug can be supported on the slide and can be mounted and guided movably in the housing with this slide.

According to the invention, the second-mentioned problem is solved by way of a plug-in connector which comprises at least the above-described plug-in unit and a socket which is complementary with respect to the plug-in unit for establishing electrical connections between electrical components, the plug making contact with the socket automatically during the movement into the plug-in position.

According to the invention, the third-mentioned problem is solved by way of a seat arrangement with at least one seat, a seat group and/or a seat bench, the seat, the seat group or the seat bench each comprising at least the above-described plug-in unit for establishing electrical connections between electrical components.

The respective seat, the respective seat group or the respective seat bench can preferably in each case comprise two plug-in units which are mounted in such a way that the seat, the seat group or the seat bench is mountable in each case in different orientations in a vehicle and is couplable to a complementary socket by means of one of the plug-in units.

In addition, the seat or the seat group or the seat bench can be couplable in each case to at least one seat longitudinal adjustment device for the longitudinal adjustment, and can comprise a seat locking means for fastening to the seat longitudinal adjustment device and a plug-in connector (also called a contacting apparatus) with the above-described plug-in unit for establishing electrical connections between electrical components. The seat locking means and the respective plug-in connector are preferably coupled to one another in such a way that the electrical connections are established or establishable automatically when the seat is locked by means of the seat locking means or after the seat is locked by means of the seat locking means. In other words: in order to continue to supply the seat, the seat group or the seat bench electrically in the case of a locked seat and in the case of a desired seat longitudinal adjustment, the electrical connection is maintained during an actuation of the seat longitudinal adjustment device and is not released. As an alternative or in addition, the seat locking means and the respective plug-in connector can be coupled to one another in such a way that the electrical connections are automatically released when the seat is unlocked or after the seat has been unlocked.

The seat arrangement can comprise a single adjustable seat, an adjustable seat bench or adjustable seat group with two seats arranged next to one another, or an adjustable seat bench or an adjustable seat group with three or more seats arranged next to one another. In particular, the seat, the seat group or seat bench is longitudinally adjustable. To this end, the seat, the seat group or the seat bench in each case comprises two seat rails (also called upper rails or sliders or slides) which are arranged parallel to one another. The seat rails are arranged, in particular, on a lower side of a seat part or seat surface of the seat, the seat group or the seat bench.

The seat arrangement which comprises either an adjustable seat or an adjustable seat bench or an adjustable seat group can have, for example, only two electrical contacting regions which are arranged so as to lie diagonally opposite one another. The electrical contacting regions are configured, in particular, in each case to receive the above-described plug-in unit or a dummy. In other words: a first one of the electrical contacting regions is active when the plug-in unit is plugged in. A second contacting region or the other electrical contacting region is passive when the dummy is plugged in. Two contacting regions can also be configured actively by way of plug-in units which are plugged in. Whether only one of the contacting regions or both contacting regions is/are active is dependent, in particular, on the number of electrical components and functions of the seat arrangement. By way of an arrangement of this type of the electrical contacting of the seats, seat bench and/or seat group, the number of plugs or plug-in units in the vehicle can be reduced.

The electrical contacting regions are connected on the seat side in each case to at least one control unit. In other words: the electrical contacting regions are coupled in terms of signal technology and electrically to the control unit, for example. The electrical contacting regions of the seat arrangement are, in particular, of identical configuration. In other words: the electrical contacting regions have the same number of electrical connections and contacts. The electrical contacting regions can be arranged on the seat arrangement along an axis of extent, in particular in the longitudinal extent of the vehicle, preferably in a mirror-symmetrical manner with respect to one another.

As a result, comfort is improved for the user. In particular, a contacting apparatus of this type which is configured as an electrical plug-in connector makes it possible to relieve the user during electrical coupling or decoupling of the seat during an installation or removal of the seat into or from the vehicle. The plug-in connector is preferably configured in such a way that the electrical connections are establishable or are established automatically, while the seat is being locked mechanically during installation or after the seat is locked mechanically during installation. In other words: the electrical connection is established automatically after the seat has been locked mechanically, and can also be released again automatically when the user unlocks the seat in order for it to be possible, for example, for it to be removed from the vehicle or to be moved in the vehicle.

Moreover, the contacting apparatus which is configured as a plug-in connector can comprise further functions for safety detection and/or position detection. A safety detection and/or position detection of this type, in particular integrated into the contacting apparatus, makes it possible, for example, to detect whether the vehicle seat is correctly installed and/or locked and where it is installed, in particular positioned, in the vehicle. In particular, a locked state, an unlocked state, a correct locking action and/or the instantaneous position or the like can also be indicated as status of these functions to the user by means of an output unit, in particular a status display.

Moreover, in the connected state, the contacting apparatus can provide a current supply, information and/or safety functions such as, for example, a current supply for a belt tensioner and/or an airbag on the vehicle seat, by means of electrical connections.

According to the invention, the fourth-mentioned problem is solved by way of a vehicle with the above-described seat arrangement.

Advantageous refinements which can be used individually or in combination with one another are the subject matter of the developments and exemplary embodiments described in the following text.

DESCRIPTION OF THE DRAWINGS

In the following text, the invention is explained in greater detail on the basis of advantageous exemplary embodiments which are shown in the figures. The invention is not restricted to these exemplary embodiments, however. In the figures.

DETAILED DESCRIPTION

Parts which correspond to one another are provided with the same designations in all the figures.

Figure 1:
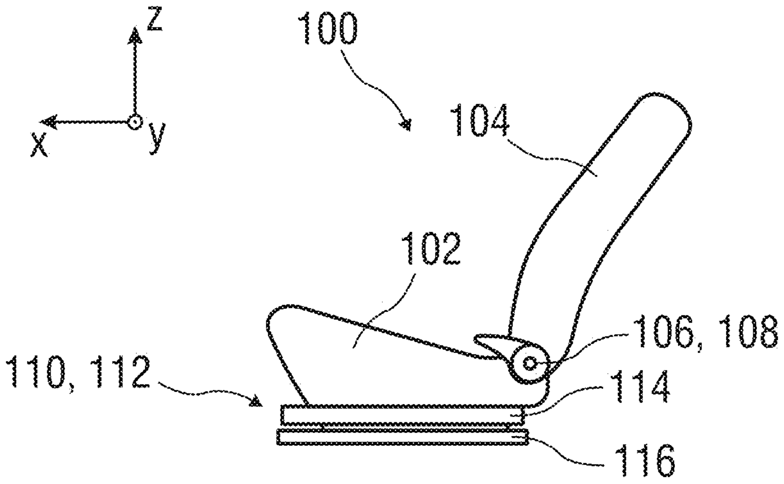
FIG. 1 shows a diagrammatic illustration of a vehicle seat with a longitudinal adjustment device in accordance with the prior art, FIG. 2 diagrammatically shows a detail of a vehicle with a second seat row and a third seat row, in which in each case at least one seat is arranged.

A vehicle seat 100 which is shown diagrammatically in FIG. 1 with respect to the prior art will be described in the following text with use of three spatial directions which run perpendicularly with respect to one another. In the case of a vehicle seat 100 which is installed in the vehicle 200 (shown in FIG. 2), a longitudinal axis x runs substantially horizontally and preferably parallel to a vehicle longitudinal direction which corresponds to the customary direction of travel of the vehicle 200. A transverse direction y which runs perpendicularly with respect to the longitudinal direction x is likewise oriented horizontally in the vehicle 200 and runs parallel to a vehicle transverse direction. A vertical direction z runs perpendicularly with respect to the longitudinal direction x and perpendicularly with respect to the transverse direction y. In the case of a vehicle seat 100 which is installed in the vehicle 200, the vertical direction z preferably runs parallel to a vehicle vertical axis.

The positional specifications and directional specifications which are used such as, for example, front, rear, top and bottom relate to a viewing direction of an occupant seated in the vehicle seat 100 in a normal seat position, the vehicle seat 100 being installed in the vehicle 200, in a use position suitable for passenger transportation with an upright backrest 104 and in the direction of travel as customary. The vehicle seat 100 can also be installed or moved, however, in a different orientation, for example transversely with respect to the direction of travel. Unless described otherwise, the vehicle seat 100 is installed in a mirror-symmetrical manner with respect to a plane which runs perpendicularly with respect to the transverse direction y.

The backrest 104 can be arranged pivotably on a seat part 102 of the vehicle seat 100. To this end, the vehicle seat 100 can optionally comprise a fitting 106, in particular an adjusting fitting, rotary fitting, latching fitting or tumbling fitting.

The positional specifications and directional specifications which are used such as, for example, radially, axially and in the circumferential direction relate to a rotational axis 108 of the fitting 106. Radial means perpendicularly with respect to the rotational axis 108. Axial means in the direction of or parallel to the rotational axis 108.

The vehicle seat 100 can optionally comprise a longitudinal adjustment device 110. The longitudinal adjustment device 110 comprises, for example, a rail arrangement 112 with a first rail element 114 and a second rail element 116. The first rail element 114 is adjustable in the longitudinal direction x relative to the second rail element 116. The first rail element 114 is fastened to the seat part 102. The second rail element 116 is fastened to a structure element of a vehicle 200, for example a vehicle floor.

For improved clarity, the first rail element 114 is called an upper rail 114 in the following description. This upper rail 114 (also called a running rail or carriage) is assigned to the vehicle seat 100 and is configured to support this vehicle seat 100. The second rail element 116 is called a lower rail 116 in the further text. The lower rail 116 is connected fixedly and, for example, to the floor of a vehicle 200.

Figure 2:
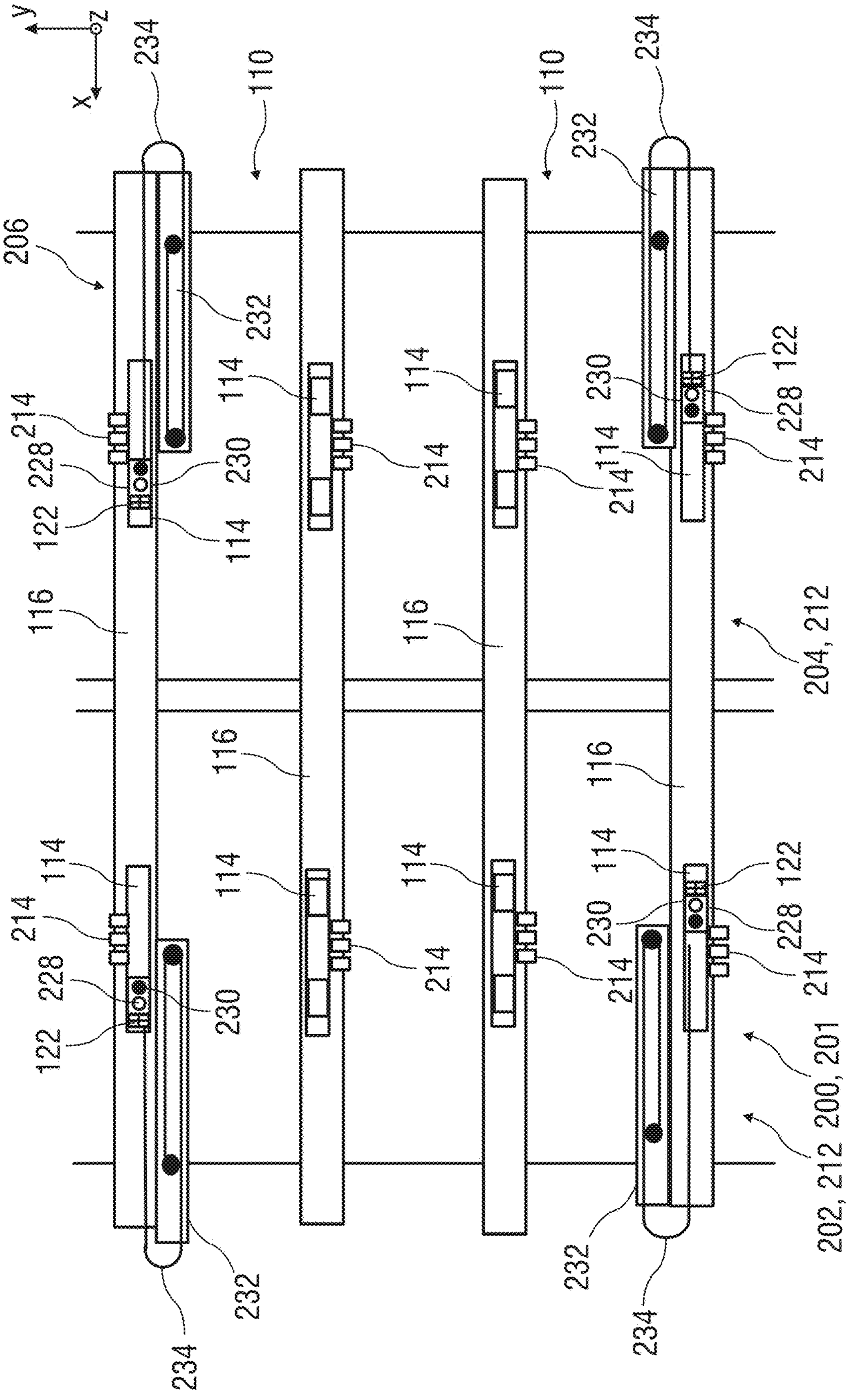

FIG. 2 diagrammatically shows a detail of a vehicle 200 with a seat arrangement 201, comprising what is known as a second seat row 202 and a third seat row 204 which are usually arranged behind a first seat row (not shown) which is configured as a driver row.

In the floor region 206, the vehicle 200 comprises two pairs of lower rails 116 of the longitudinal adjustment device 110 which are continuous over the second seat row 202 and the third seat row 204. Per pair of lower rails 116 and per seat row 202 and 204, two seats 100 (shown in FIG. 4) which are configured as adjustable, in particular longitudinally adjustable, individual seats can be arranged next to one another in the transverse direction y, or only one adjustable, in particular longitudinally adjustable, seat group 210 (shown in FIG. 4) which comprises two seat surfaces 208 can be arranged, or only one adjustable, in particular longitudinally adjustable, seat bench 212 (shown in FIG. 4) which comprises three seat surfaces 208 can be arranged releasably on the longitudinal adjustment device 110 and removably from the longitudinal adjustment device 110.

Figure 3:
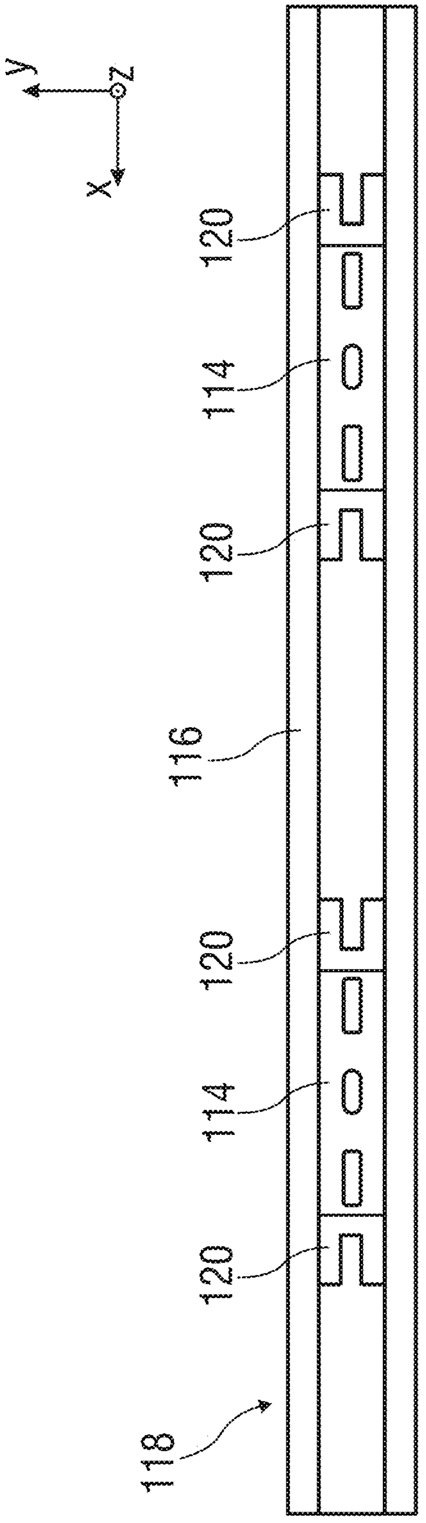
FIG. 3 shows a perspective illustration of a rail pair with a lower rail which is configured as a floor rail and two upper rails which are configured as seat rails and are arranged movably in the floor rail.

Per pair of lower rails 116 and per seat row 202 and 204 (shown in FIG. 2), any desired combinations of seats 100, seat groups 210 and seat benches 212 can be couplable, for example, to the longitudinal adjustment device 110 (shown in FIG. 3). In the longitudinal direction x, for example, in each case two seats 100 (shown in FIG. 4) which are configured as individual seats can be arranged behind one another, or two seat groups 210 each having two seat surfaces 208 can be arranged behind one another, or two seat benches 212 which comprise three seat surfaces 208 can be arranged behind one another, or a combination of two separate seats 100 next to one another and a seat group 210 or a seat bench 212 behind one another can be arranged releasably on the longitudinal adjustment device 110 and removably from the longitudinal adjustment device 110.

At least one pair of upper rails 114 for coupling to the floor rails 116 is provided on the respective seat 100 or the seat group 210 or the seat bench 212. The upper rails 114 are arranged on and fastened to a lower side of the seat 100, the seat group 210 or the seat bench 212.

The respective seat 100, the seat group 210 or the seat bench 212 can each comprise at least one seat locking means 214 (shown in FIG. 2) for locking the upper rails 114 and the lower rails 116 to one another in order to block a longitudinal movement of the upper rails 114 relative to the lower rail 116 or vice versa.

Figure 4:
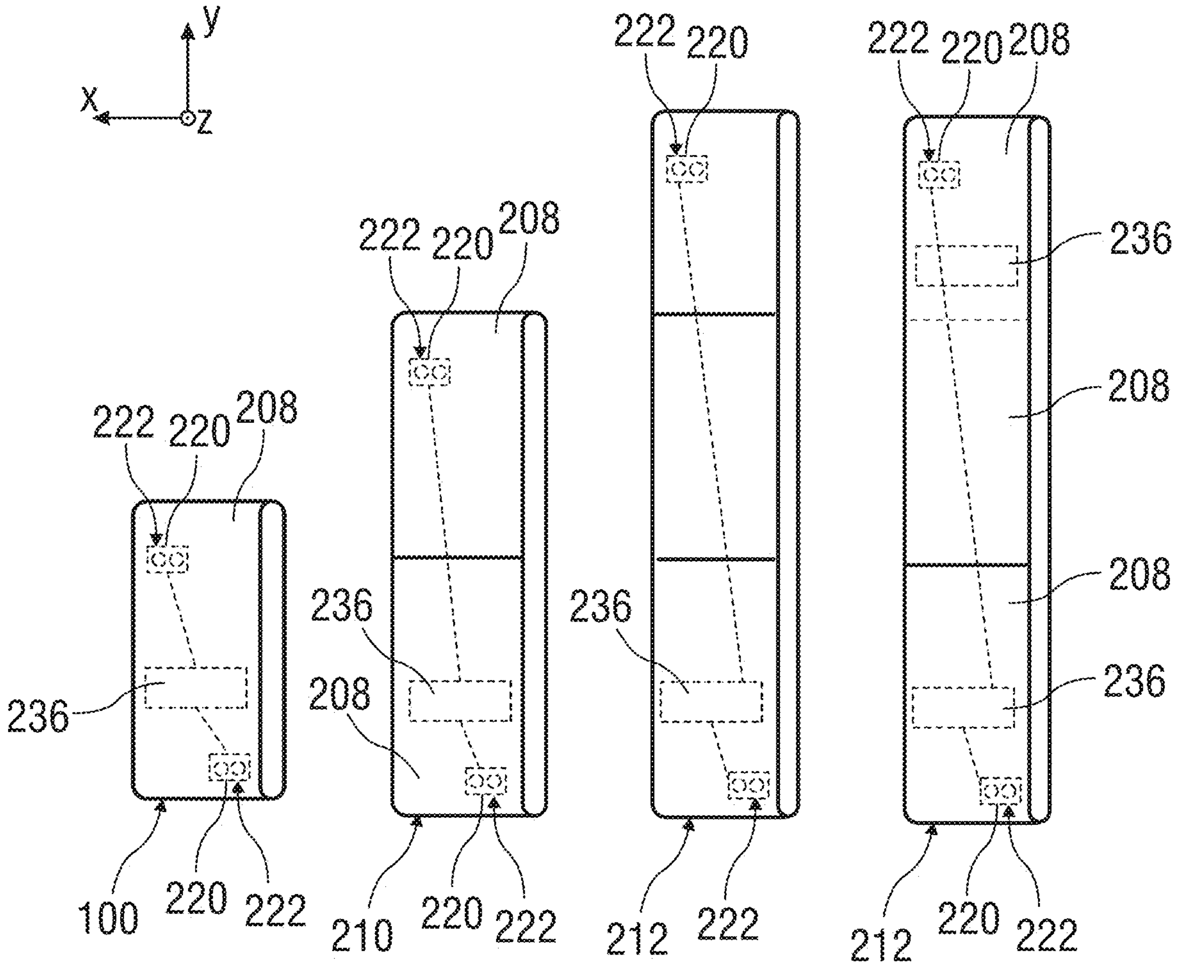
FIG. 4 shows a perspective illustration of different seat arrangements with one seat, two seats and three seats.

For electrical coupling of electrical components and/or electronic components, for example at least a control unit 236 (shown in FIG. 4), an airbag module, a seat heater, an actuating motor or the like of the respective seat 100 or the seat group 210 or the seat bench 212, to a current supply which is at a distance from the seat and/or to other electrical components and/or electronic components which are at a distance from the seat, the respective seat 100, the seat group 210 or the seat bench 212 can comprise at least one, preferably two contacting regions 220 (shown in FIG. 4).

Figure 4A:
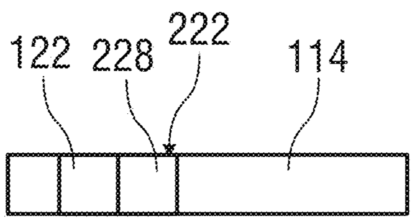
FIG. 4A shows a diagrammatic block diagram of an active upper rail.

The respective upper rail 114 can comprise counter-contacting regions 228. For example, only one of the upper rails 114 of a rail pair 118 (shown in FIG. 3) which is assigned to an individual seat 100 or seat surface 208 of the seat group 210 or the seat bench 212 has a counter-contacting region 228. In particular, only the outer upper rails 114 each have a counter-contacting region 228 in the respective seat row 202 or 204. As an alternative, all the upper rails 114 can have counter-contacting regions 228. In a case of this type, for example in the case of the outer upper rails 114, the sockets 230 (or, as an alternative, the plug-in units 222 which are shown in FIG. 4) can be plugged in the counter-contacting region 228 and, in the case of the inner upper rails 114, the dummies 226 (shown in FIG. 4B) can be plugged in the counter-contacting region 228. In the case of a plugged-in socket 230 or, as an alternative, a plugged-in plug-in unit 222 in the upper rail 114, the latter is configured as an active rail, as shown in FIG. 4A for example. In the case of a plugged-in dummy 226 in the counter-contacting region 228 of the relevant upper rail 114, the latter is configured as a passive rail, as shown in FIG. 4B.

The seat-side contacting regions 220 and the rail-side counter-contacting regions 228 are arranged in such a way that both two individual seats 100 and a seat group 210 or a seat bench 212 can be arranged and coupled electrically in the respective seat row 202 or 204, without it being necessary for a modification to take place. For example, two contacting regions 220 are provided on the seat side, that is to say on a lower side of the respective seat 100 or the seat group 210 or the seat bench 212, which contacting regions 220 are arranged on the lower side so as to lie diagonally opposite one another. The counter-contacting regions 228 are provided, for example, only on the outermost upper rails 114 of the respective seat row 202 or 204. Therefore, seat-side electrical components and/or electronic components of the seat 100 or the seat group 210 can be coupled electrically to components at a distance from the seat merely via one plug-in connector 224 (shown in FIG. 5) on one of the outermost upper rails 114. In contrast, the seat-side electrical component and/or electronic components of the seat bench 212 can be coupled electrically to components at a distance from the seat, for example, via two electrical plug-in connectors 224 on the two outermost upper rails 114.

Figure 4B:
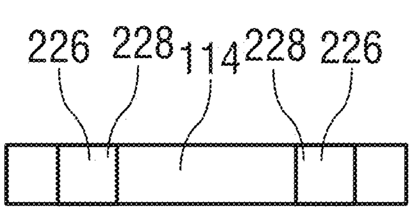
FIG. 4B shows a diagrammatic block diagram of a passive upper rail.

The respective contacting region 220 is configured to receive a plug-in unit 222 or a socket 230 of one of the plug-in connectors 224 (also called a contacting apparatus, shown in FIG. 5) or a dummy 226 (shown in FIG. 4B).

In other words: the respective plug-in connector 224 comprises the plug-in unit 222 and the corresponding socket 230 as complementary components. Here, the plug-in unit 222 can be arranged on the seat 100, on the seat group 210 or the seat bench 212, and the socket 230 can be arranged on the movable upper rail 114, or vice versa. In the case of a plug-in unit 222 which is plugged into the socket 230, at least one electrical connection is established between components at a distance from the seat and seat-side components, for example electrical connections between an electrical energy supply unit, at least one control unit, at least one drive unit and/or further electrical and/or electronic components.

The respective plug-in connector 224 and the respective seat locking means 214 are preferably coupled to one another in such a way that the electrical connections of the plug-in connector 224 are established or establishable automatically when the seat 100 or the seat group 210 or the seat bench 212 is locked by means of the associated seat locking means 214 or after the seat 100 or the seat group 210 or the seat bench 212 is locked by means of the seat locking means 214. As an alternative or in addition, the seat locking means 214 and the respective plug-in connector 224 can be coupled to one another in such a way that the electrical connections are automatically released when the seat 100 or the seat group 210 or the seat bench 212 is unlocked or after the seat 100 or the seat group 210 or the seat bench 212 has been unlocked.

On account of the configuration of the upper rails 114 as movable rails, moreover, a cable cassette 232 for automatic rolling up or unrolling of cables 234 of the electrical connections during the adjustment of the upper rail 114 with respect to the lower rail 116 can be provided on those upper rails 114 which are configured as active rails with a plugged-in plug-in unit 222 or a plugged-in socket 230.

In addition, the active upper rail 114 can comprise a sensor 122. The sensor 122 can be configured, for example, as a position sensor or locking sensor for position detection or for monitoring a locking action of the seat 100, the seat group 210 or the seat bench 212.

FIG. 3 shows a perspective illustration of a rail pair 118 with a lower rail 116 which is configured as a floor rail and two seat rails or upper rails 114 which are arranged movably in the lower rail 116. The lower rail 116 is of substantially longer configuration than the two upper rails 114. The movable upper rails 114 each comprise fastening regions 120 on the end side, in particular on the front side, in particular fastening elements or fastening receptacles.

The fastening regions 120 can be of different configuration in a manner which is dependent on the type of seat fastening. In the exemplary embodiment which is shown according to FIG. 3, the fastening regions 120 are configured as claw fastening means which each comprise a receiving opening, into which claws (not shown in greater detail) of the vehicle seat 100 engage in a holding manner. As an alternative, the respective fastening region 120 can be designed to fasten the vehicle seat 100 to the upper rail 114 by means of a screw connection or welded connection. The claw fastening of the fastening region 120 can be fastened to the upper rail 114 in a force-fitting, form-fitting and/or materially bonded manner. For example, the respective claw fastening or claw receptacle is fastened to the upper rail 114 by means of a welded connection.

FIG. 4 shows a perspective illustration of different seat arrangements 201 for the vehicle 200. In the vehicle 200, individual vehicle seats 100, one or more seat groups 210 with two seat surfaces 208, and one or more seat benches 212 with three seat surfaces 208 can be arranged in a variable manner on the longitudinal adjustment device 110 (shown in FIG. 2). For electrical and/or electronic coupling of seat components to components at a distance therefrom, both each individual vehicle seat 100 and each seat group 210 or each seat bench 212 each has two contacting regions 220 which are arranged so as to lie diagonally opposite one another.

The respective contacting region 220 can be configured to receive a plug-in unit 222 or a socket 230 of one of the plug-in connectors 224 (also called a contacting apparatus, shown in FIG. 5) or a dummy 226 (shown in FIG. 4B).

The plug-in unit 222 or the socket 230 (shown in FIG. 2) of the respective contacting region 220 is coupled electrically and/or in terms of signal technology to at least one electronic control unit 236. As is shown using the example of one of the seat benches 212, two electronic control units 236 (also called ECU for short) can also be provided. The cabling between the contacting regions 220 and the control units 236 can be prefabricated. If a plug-in unit 222 or a socket 230 is plugged in, this contacting region 220 and therefore the coupled upper rail 114 is active in the case of coupling to the complementary component, a socket 230 or a plug-in unit 222, as shown in FIG. 4A. If, in contrast, a dummy 226 is plugged in, the upper rail 114 which is coupled to it is passive, as shown in FIG. 4B.

The plug-in unit 222 of the plug-in connector 224 is preferably mounted on the seat side on the seat structure of the vehicle seat 100, the seat group 210 or the seat bench 212.

In order to mount the vehicle seat 100, the seat group 210 or the seat bench 212 in what is known as a vis-a-vis position with respect to other vehicle seats 100, seat groups 210 or seat benches 212, the respective component (vehicle seat 100, seat group 210 or seat bench 212) comprises two plug-in units 222 or two sockets 230. The two plug-in units 222 (also called seat plugs) or the two sockets 230 are integrated (that is to say, pre-cabled) completely into the seat cabling, and provide the same functions.

Only one complementary element (only one socket 230 or one plug-in unit 222) is installed on the vehicle side, in particular on the floor rail or lower rail 116. The socket 230 or the plug-in unit 222 (also called a plug for short) is always mounted in the same ratio with respect to the seat locking system. Vehicle seats 100 and/or seat groups 210 can be mounted in the second seat row 202 on the right or on the left and in the third seat row 204 on the right or on the left. The seat bench 212 is mounted over the entire width of the second seat row 202 or the third seat row 204.

Depending on where the vehicle seat 100 or the seat group 210 is mounted (on the right or on the left) or how the vehicle seat 100 or the seat group 210 is installed (in the direction of travel or counter to the direction of travel), one of the two plug-in units 222 or the socket 230 comes into contact with the complementary component in the lower rail 116 by way of the socket 230 or the plug-in unit 222 (also called a vehicle plug). The cabling or the cable braid of the vehicle seat 100, the seat group 210 or the seat bench 212 is spliced correspondingly.

FIG. 4A shows by way of example an active upper rail 114 with a plugged-in plug-in unit 222. As an alternative, a socket 230 can be plugged in if the plug-in unit 222 is arranged on the seat side. In addition, the active upper rail 114 can comprise the sensor 122 (shown in FIG. 2). The sensor 122 can be configured on the associated upper rail 114, for example, as a position sensor or locking sensor for position detection or for monitoring a locking state of the vehicle seat 100, the seat group 210 or the seat bench 212. The sensor 122 can be integrated, in particular, into the plug-in connector 224 (shown in FIG. 5), for example on the plug-in unit 222 or the socket 230. The sensor 122 makes the detection possible, for example, as to whether the vehicle seat 100, the seat group 210 or the seat bench 212 is installed and/or locked correctly and where they are each installed, in particular positioned, in the vehicle 200. In particular, a locked state, an unlocked state, a correct locking action and/or the instantaneous position or the like can also be indicated as status of these functions to the user by means of an output unit (not shown), in particular a status display.

FIG. 4B shows by way of example a passive upper rail 114 with a plugged-in dummy 226.

Figure 5:
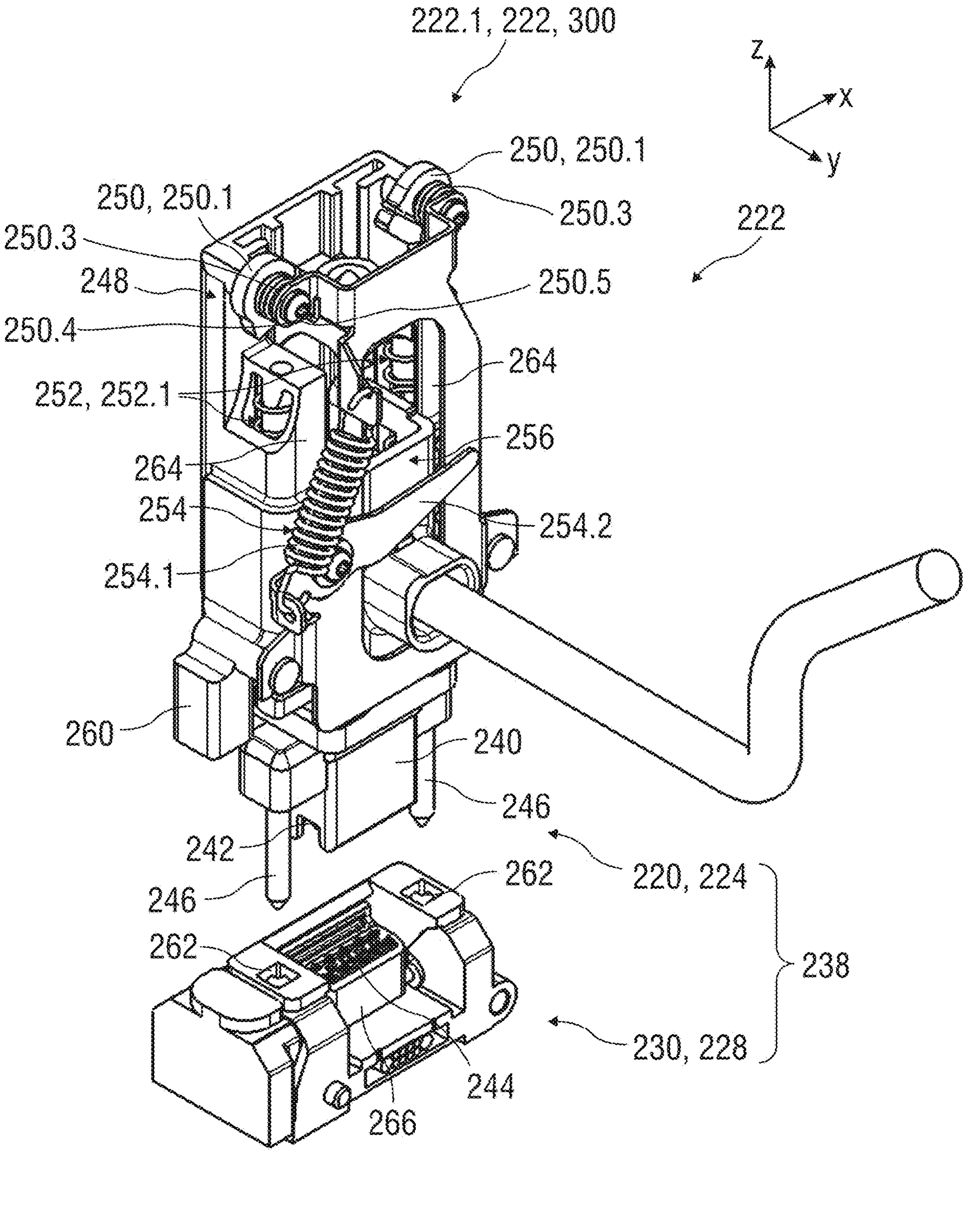
FIG. 5 shows an exploded illustration of a contacting apparatus which is configured as a plug-in connector, comprising a plug-in unit and a socket, the plug-in unit being unblocked and being shown in a plug-in position, FIG. 6 diagrammatically shows a perspective illustration of the plug-in unit in a blocking position, FIG. 7 diagrammatically shows a side view of the plug-in unit according to FIG. 6, FIG. 8 diagrammatically shows a sectional illustration of the plug-in unit according to FIG. 7.

FIG. 5 shows an exploded illustration of a contacting apparatus 238 which is configured as a plug-in connector 224. The plug-in connector 224 comprises the plug-in unit 222 and the socket 230.

The contacting apparatus 238, in particular the plug-in connector 224, comprises, as complementary components, at least the one plug-in unit 222 with a plug 240 with a number of connector contacts 242, in particular with a number of contact pins and/or contact elements, and the socket 230 with a number of corresponding contact counter-elements 244 which are formed, for example, as plug-in openings and are formed from an electrically conducting material for establishing an electrical connection. The socket 230 is arranged on the movable upper rail 114, and the plug-in unit 222 is arranged on the vehicle seat 100, the seat group 210 or the seat bench 212 (as shown in FIGS. 2 and 4), or vice versa.

The plug-in unit 222 can additionally have positioning pins 246 for reliable orientation during coupling to the socket 230.

Moreover, the plug-in unit 222 can comprise a housing 248, a triggering unit 250 and a drive unit 252. The components of the plug-in unit 222, in particular the plug 240, the triggering unit 250, the drive unit 252 and the housing 248, can be preassembled to form a mounting module 222.1. In particular, the plug 240, the triggering unit 250 and the drive unit 252 are mounted in and/or on the housing 248.

Here, the triggering unit 250 can be mounted movably on the housing 248. In particular, the triggering unit 250 is mounted at an upper end of the housing 248 movably, in particular pivotably about a pivot axis 250.5 by means of a pivot bearing 250.4. In particular, the triggering unit 250 is mounted movably on the housing 248 at an end which faces away from the plug 240.

In other words: the triggering unit 250 is arranged at one end of the housing 248, and the plug 240 is arranged at the opposite end. The drive unit 252 is arranged between them.

Figure 6:
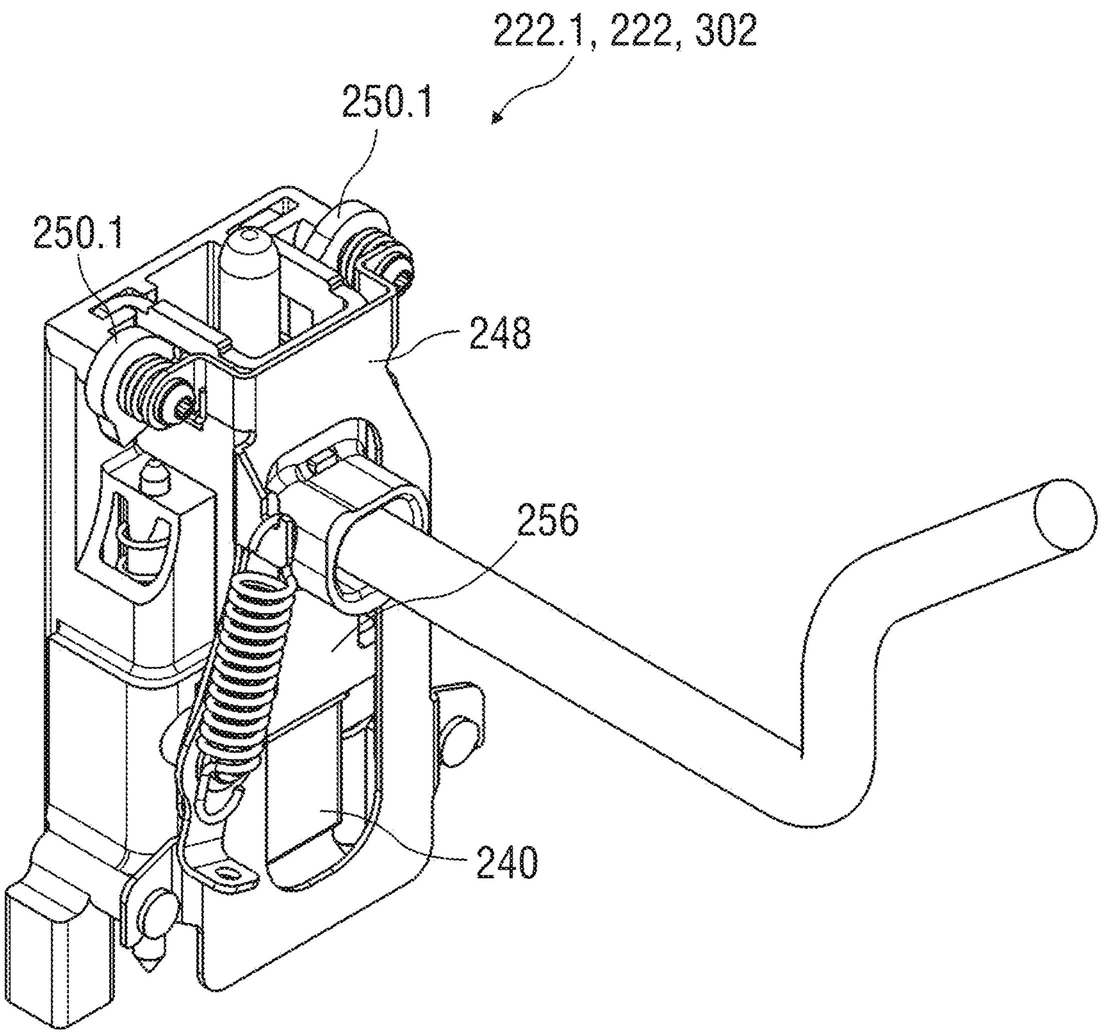
Figure 7:
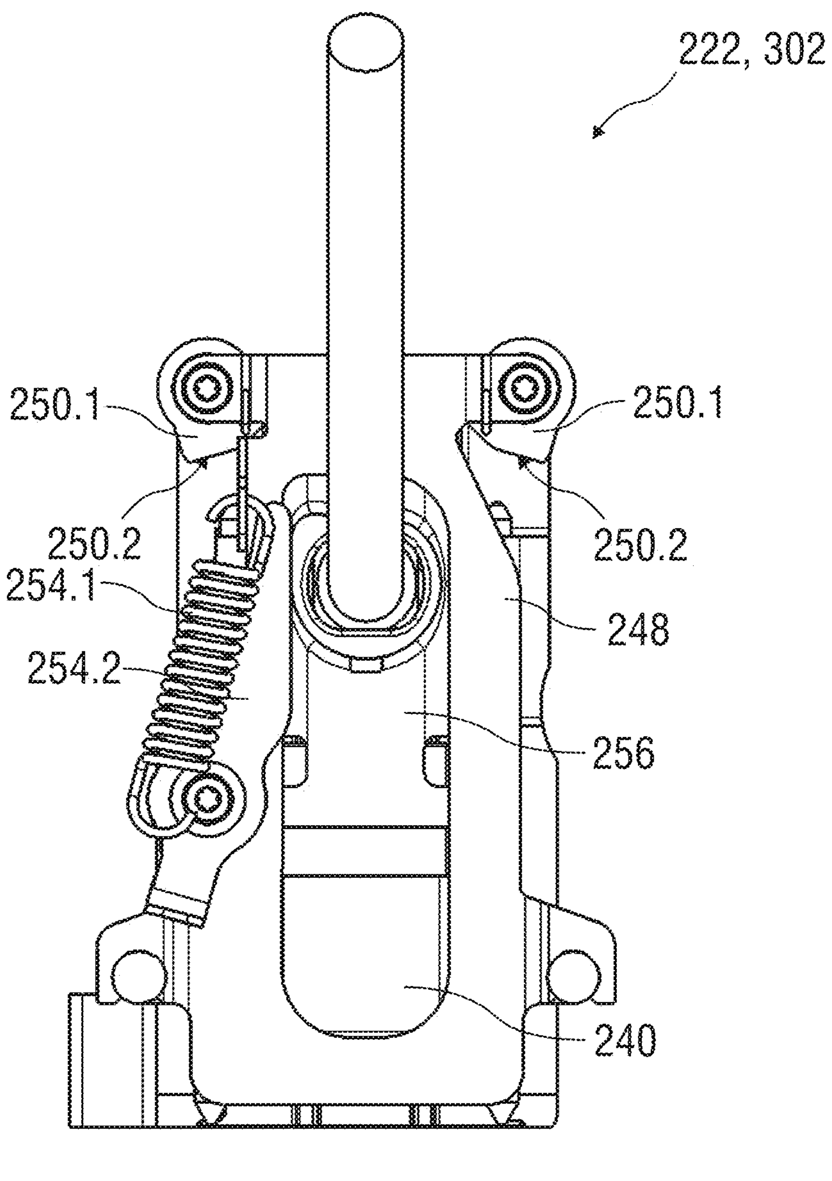
Figure 8:
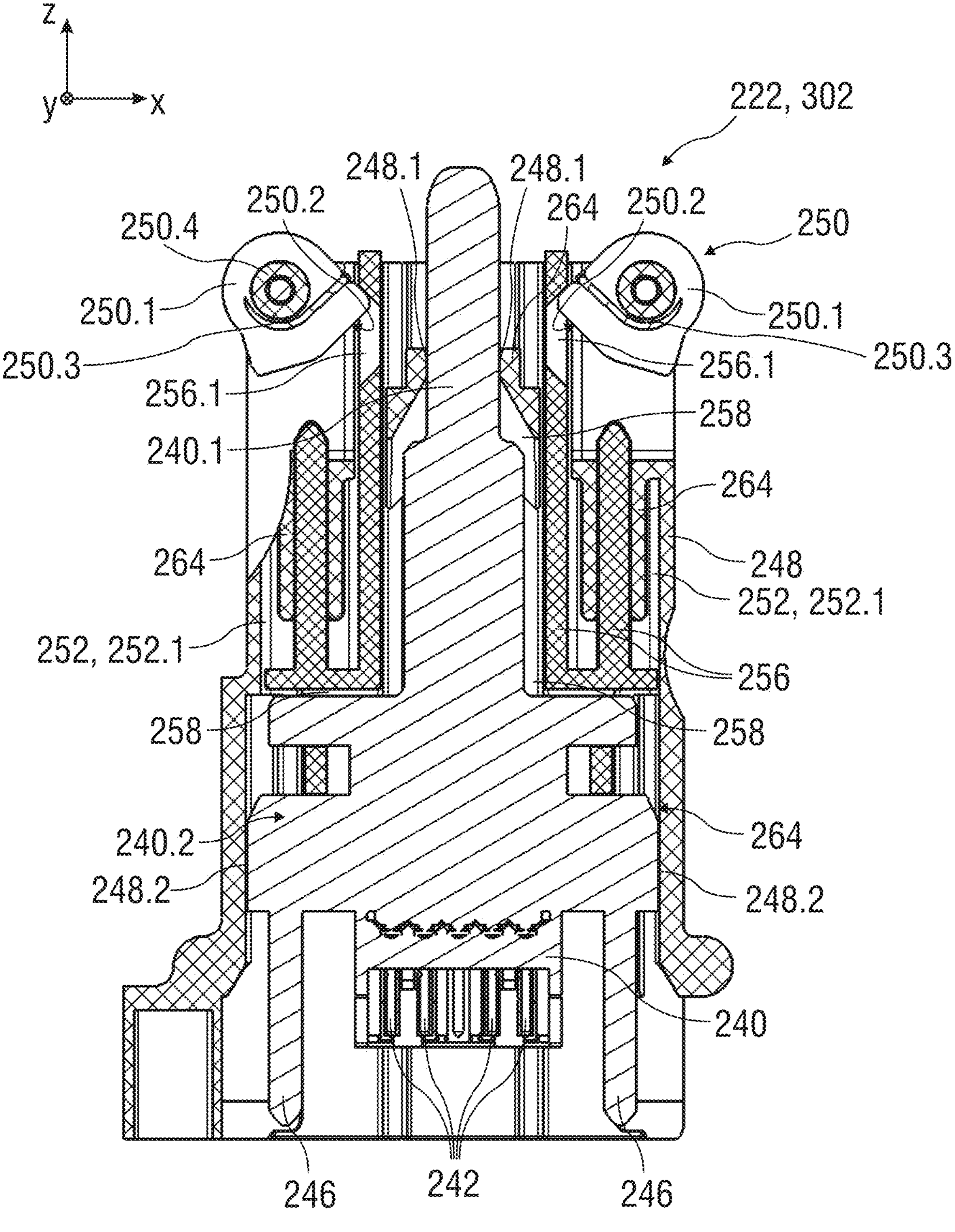

In addition, the respective locking element 250.1 can be preloaded by means of a spring 250.3 into a locking position or rest position 302 (shown in FIGS. 6 to 8).

Figure 10:
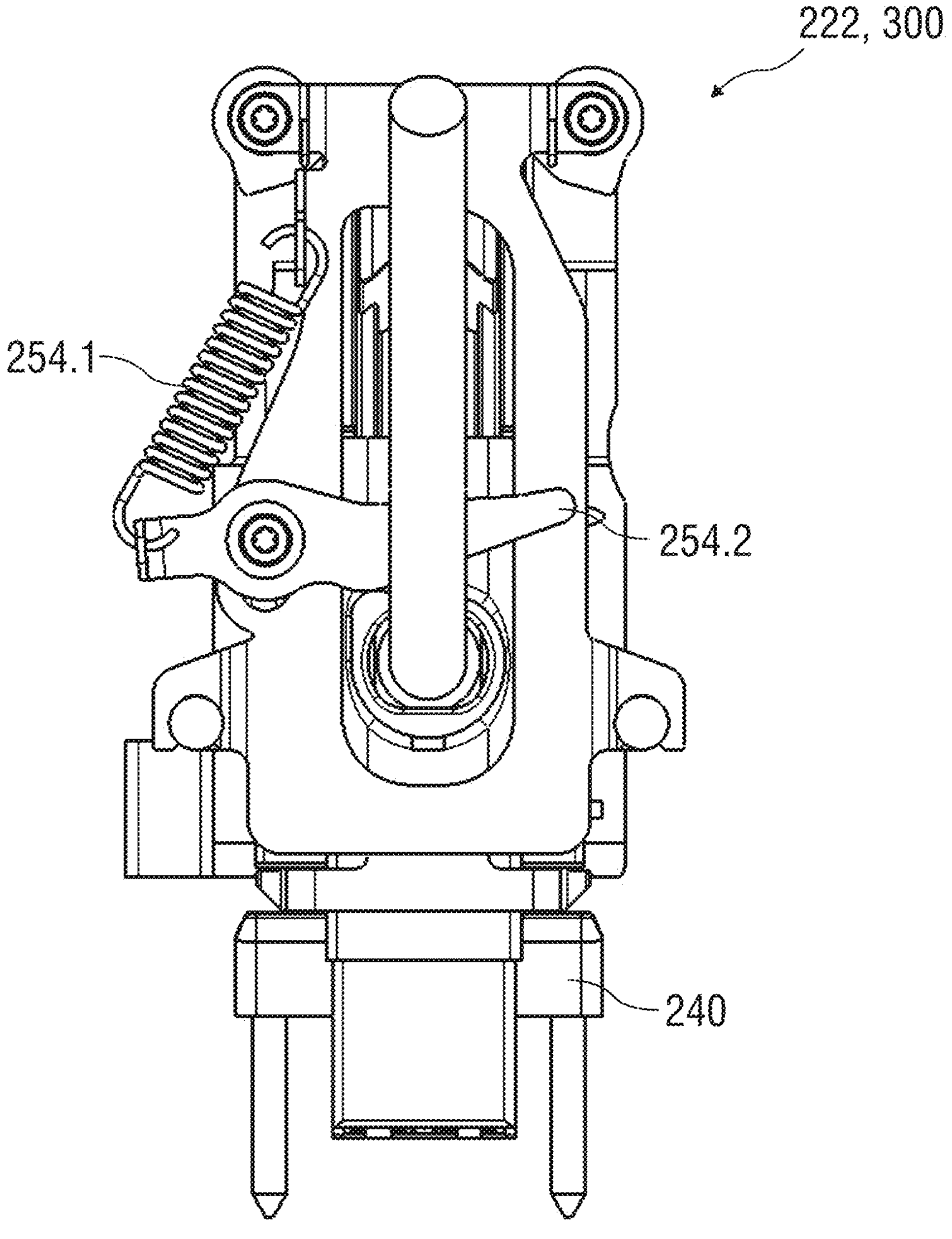
Figure 11:
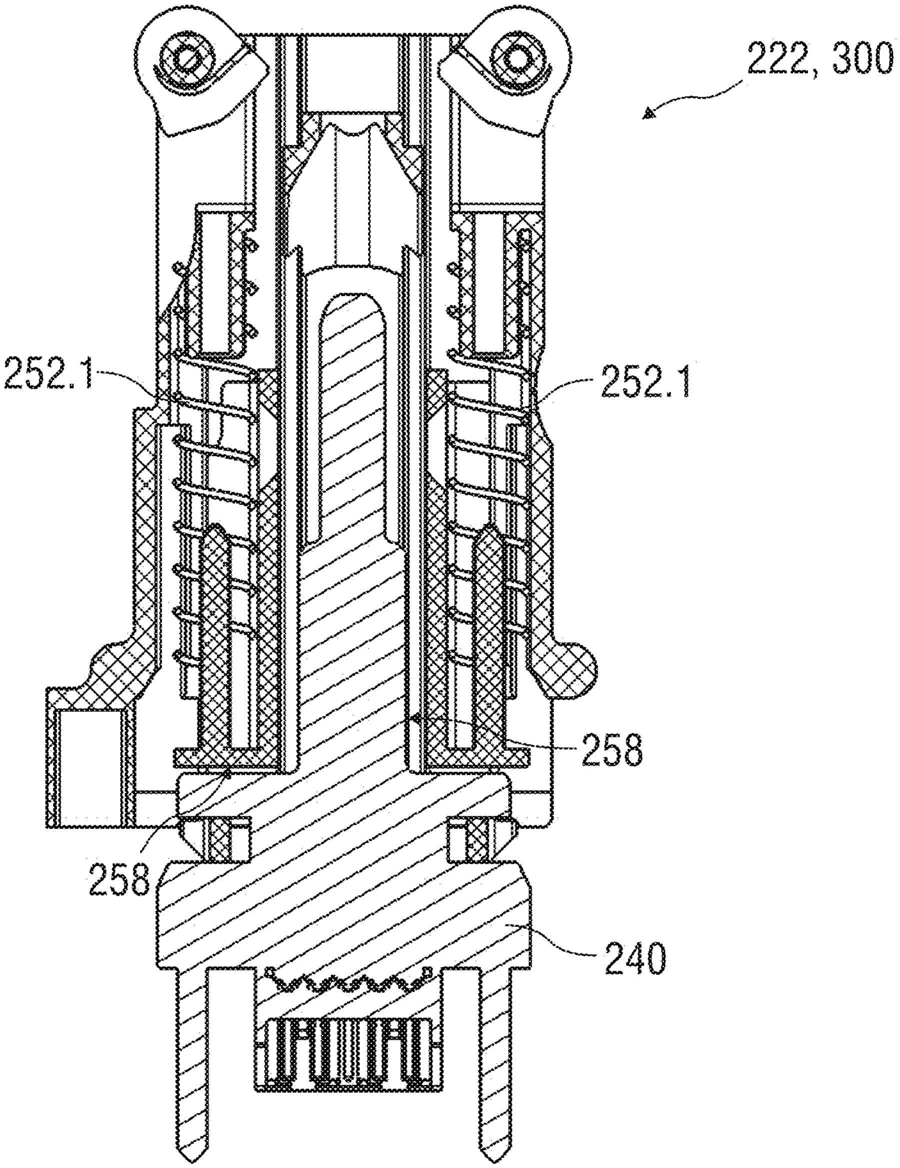

Upon triggering, the triggering unit 250 unblocks the drive unit 252, with the result that the plug 240 is movable, driven by the drive unit 252, in particular a spring element 252.1, relative to the housing 248 from a rest position 302 (shown in FIGS. 6 to 8) into the plug-in position 300 (shown in FIGS. 5, 10 and 11).

The triggering unit 250 (also called a blocking unit) can be configured, for example, in such a way that, upon triggering, it is actuable into a triggering position (also called an unblocking position or plug-in position 300, shown in FIGS. 5, 10 and 11), as a result of which the drive unit 252 is unblocked (also called activated or released) which in turn brings about a plug-in movement of the plug 240.

The triggering unit 250 can be coupled, for example, to the seat locking means 214 of the associated seat arrangement 201, of one of the vehicle seats 100, of the seat group 210 or of the seat bench 212. In addition, a restoring unit 254 can be provided for the plug 240. The restoring unit 254 can preferably be coupled to the seat locking means 214.

The triggering unit 250 can comprise at least one movable locking element 250.1 which, in a first position, blocks the drive unit 252 and holds the plug 240 in a rest position 302 (also called a blocking position or opening position), as shown in FIGS. 6 to 8. The movable locking element 250.1 can unblock or release the drive unit 252 in a second position, in order to adjust the plug 240 out of the rest position 302 into the plug-in position 300, as shown in FIGS. 5, 10 and 11.

The locking element 250.1 can be mounted on the housing 248 pivotably about a pivot axis. The locking element 250.1 can comprise a blocking portion 250.2 (shown in FIGS. 7 and 8) which, in the first position of the locking element 250.1, engages in a blocking manner into a blocking opening 256.1 of a slide 256.

The plug-in unit 222 is unblocked in FIG. 5. The plug-in unit 222 is shown in the extended plug-in position 300, in which the plug 240 is moved out of the housing 248.

The plug-in connector 224 comprises at least the socket 230 and the plug-in unit 222 which are couplable to one another.

The plug-in unit 222 (also called a male plug) comprises at least:

- the housing 248 which forms the interface to the seat structure of the vehicle seat 100, of the seat group 210 or of the seat bench 212,
- the triggering unit 250 (also called a blocking unit or locking apparatus) which locks the plug 240 in a parked position or the rest position 302 when, for example, the vehicle seat 100, the seat group 210 or the seat bench 212 is not mounted in the vehicle 200,
- a slide 256 which is mounted and supported movably in the housing 248, the slide 256 being mounted and guided only vertically in the housing 248, and
- the plug 240 which is supported on the slide 256 and is mounted movably in the housing 248 with this slide 256.

In addition, the plug 240 can be mounted and held with play 258 (shown in FIG. 8) in the slide 256 (also called a holder).

The housing 248 of the plug 240 can have a guide device 264, in which the slide 256 is guided or is guidable in the vertical direction (in the vertical direction z upward or downward) in a groove or a sleeve, in particular in a manner of a T-shaped groove.

The plug 240 is guided by way of the slide 256. The plug 240 can rotate and/or move relative to or in the slide 256 with play 258.

The plug 240 has, in particular, a number of connector contacts 242 which corresponds to the number of plug-in openings of the socket 230. The plug 240 is the carrier for the electrical contacts or connector contacts 242, for example ten, sixteen or twenty contacts which can also be used for safety-relevant functions. A wiring harness which establishes the electrical connection to the seat applications is mounted in the interior of the plug 240. This is a type of integrated cable.

For orientation onto the socket 230, the plug-in unit 222, in particular the plug 240, has two positioning pins 246 which orient the plug 240 on the socket 230 in such a way that the electrical connection can take place without damage of the electrical pins or terminal contacts 242. These positioning pins 246 can make a tolerance compensation possible between the seat (vehicle seat 100, seat group 210 or seat bench 212) and the vehicle 200.

After triggering or unblocking of the triggering unit 250, the drive unit 252 which is configured as a spring element 252.1 guides the plug 240 with low force into the position, the spring element 252.1 acting with such a force that the plug 240 is pressed into the socket 230. The spring element 252.1 is configured, in particular, as a low force spring. The spring element 252.1 is arranged, for example, between the housing 248 and the slide 256. Two identical spring elements 252.1 are preferably provided as drive unit 252.

A high force spring 254.1 can be provided in addition to the low force spring. The high force spring 254.1 acts in addition to the low force spring (spring element 252.1) and supplies the required force to hold the connection of the plug 240 and the socket 230 (with consideration of tolerance, connecting force, temperature or other similar loads). The high force spring 254.1 acts only in the range, in which the plug 240 enters into the connection with the socket 230 and therefore in the plugged-in state of the plug-in connector 224. The high force spring 254.1 is tensioned between the housing 248 and the slide 256.

In addition, the plug-in unit 222 can comprise a magnet element 260 which generates a magnetic field which can be detected by a sensor 122, in particular a Hall sensor, which is situated in the socket 230 or the slide 256.

The socket 230 (also called a female plug) is mounted on the movable upper rail 114 within the rail profile of the lower rail 116 (also called a floor rail) and makes the electrical functions of the vehicle 200 available such as current, communication, safety functions or the like.

The socket 230 comprises at least:

- position openings 262, complementary with respect to the positioning pins 246.

The position openings 262 are matched to the positioning pins 246 on the plug 240. As a result of the position openings 262 (also called position holes), the plug 240 finds the appropriate orientation with respect to the socket 230, with the result that the electrical terminal contacts 242 (pins) are connected correctly.

In addition, the socket 230 can comprise a movable, in particular pivotable or foldable, dust cover 266 which, for example, covers or closes the contact counter-elements 244 when the vehicle seat 100, the seat group 210 or the seat bench 212 is not mounted in the vehicle 200. By way of a movable dust cover 266 of this type, the contact counter-elements 244 which are configured as electrical contact openings in the socket 230 are protected against dust, particles, water droplets and contamination.

The sensor 122, in particular the Hall sensor, changes the status when the magnet element 260 on the plug 240 appears in the region of the sensor 122 when the vehicle seat 100, the seat group 210 or the seat bench 212 is installed and mounted in the vehicle 200.

The status of the Hall sensor is used to detect whether the vehicle seat 100, the seat group 210 or the seat bench 212 is situated in a lockable position. After successful electrical connection of the vehicle seat 100, the seat group 210 or the seat bench 212 to the vehicle 200, the information that the vehicle seat 100, the seat group 210 or the seat bench 212 is locked correctly is generated, for example, by means of the control unit 236. Otherwise, the vehicle seat 100, the seat group 210 or the seat bench 212 is not correctly locked (based on the Hall sensor) on account of missing communication between the control unit 236 on the vehicle seat 100, the seat group 210 or the seat bench 212 and the components which are at a distance from the seat in the vehicle 200.

All of the vehicle seats 100, seat groups 210 and/or seat benches 212 can be removed and reinstalled at different positions in the vehicle 200. In order to provide a control system (also "command system"), for example on the dashboard, in the vehicle 200 with the correct information as to which vehicle seat 100, which seat group 210 and/or which seat bench 212 are/is being used, the vehicle 200 has to detect where the vehicle seat 100, the seat group 210 or the seat bench 212 is mounted.

For example, resistors which differ from one another can be installed at the different seat locations or seat positions in the vehicle 200. In other words: the possible seat locations or seat positions, to which the vehicle seat 100, the seat group 210 or the seat bench 212 can be attached, can be encoded by way of a corresponding resistor in the socket 230.

When the vehicle seat 100, the seat group 210 or the seat bench 212 is connected electrically to the vehicle 200, the seat-side control unit 236 (shown in FIG. 4) checks this resistor and its position and therefore the identification of the vehicle seat 100, the seat group 210 or the seat bench 212, and sends an information item to the control system in the dashboard as to the position in which the vehicle seat 100, the seat group 210 or the seat bench 212 is or was mounted in the vehicle 200. In addition, this position detection can be coupled to a belt sensor system for seatbelt reminding in the case of a belt not being worn.

In order to establish the electrical connection between the plug 240 and the socket 230, the locking action of the plug 240 has to be released or unlocked from the parked position or rest position 302.

The plug-in unit 222 comprises, for example as triggering unit 250 (also called a locking unit or blocking unit), two spring-loaded locking elements 250.1 which hold the slide 256 together with the plug 240 in the parked position or rest position 302 as long as the vehicle seat 100, the seat group 210 or the seat bench 212 is not installed into the vehicle 200. The locking elements 250.1 are controlled by way of a mechanical system which is coupled to the seat locking means 214 of the vehicle seat 100, the seat group 210 or the seat bench 212 in the vehicle 200, for example is movement-coupled via a Bowden cable or joint mechanism or lever mechanism or the like (not shown).

The locking elements 250.1 can be automatically unlockable. For example, they can be unlocked automatically on account of the above-described coupling when the vehicle seat 100, the seat group 210 or the seat bench 212 is mounted and locked on the upper rail 114.

The respective locking element 250.1 can be configured, for example, as an eccentric, for example an eccentric cam or an eccentric lever. Moreover, the respective locking element 250.1 can be fixable by means of the spring 250.3 in a predefined rotary angle position, in particular in the rest position 302 (called the locking position or blocking position, shown in FIGS. 7 and 8). In particular, the respective locking element 250.1 is fixable in a rotary angle position which corresponds to the set preload of the spring 250.3, in particular a preloading spring, in order to ensure the releasable locking action of the drive unit 252.

When the vehicle seat 100, the seat group 210 or the seat bench 212 is mounted and locked, for example, in the vehicle 200, the plug 240 is unlocked automatically by way of the mechanically unlocked triggering unit 250 and is driven by means of the drive unit 252. For example, the locking element 250.1 which is configured as an unlocking eccentric locks/unlocks in a manner which is dependent on the locked state of the vehicle seat 100, the seat group 210 or the seat bench 212 in the vehicle 200. The locking elements 250.1 are locked to the slide 256 which guides the plug 240 in the plug-in connection.

In the case of released locking elements 250.1, the plug 240 is guided on the lower rail 116 via the slide 256 through the housing 248 for the connection to the plug-in openings (contact counter-elements 244) of the socket 230.

FIG. 6 shows the plug-in unit 222 in a perspective illustration with the plug 240 in the rest position 302. The slide 256 is held within the housing 248 in an upper position by means of the locking elements 250.1.

FIG. 7 shows the plug-in unit 222 in a side view with the plug 240 in the rest position 302. The locking elements 250.1 are pivoted into the housing 248 and block the slide 256 and therefore the plug 240 which is connected to it or is held by it against a longitudinal movement downward out of the rest position 302 into the plug-in position 300 (shown in FIG. 5).

The high force spring 254.1 interacts with a lever 254.2, in order to generate or to bring about the required force for pushing the plug 240, in particular the positioning pins 246, into the socket 230, as will be described in greater detail in the following text.

FIG. 8 shows the plug-in unit 222 in the rest position 302. The housing 248 of the plug 240 has the guide device 264, in which the slide 256 is guided or a guidable in the vertical direction (in the vertical direction z upward or downward) in a groove or a sleeve, in particular in a type of T-shaped groove.

The guide device 264 is configured to permit a movement and guidance only in the vertical direction or vertical direction z. It is the function of the guide device 264 to make correct orientation of the plug 240 with respect to the socket 230 possible independently of the applied force.

A corresponding force, in particular drive force, for automatic connection of the plug 240 to the socket 230 is required in order to provide a suitable connecting force for a secure connection over the entire service life under all conditions. This force is dependent, in particular, on the selected electrical pin. The latter is selected in accordance with the requirement of suitable cycles. On this basis, the plug-in connector 224 consists of a system of springs, in particular of the spring elements 252.1 which are configured as low force springs, for feeding the plug 240 into the socket 230 and therefore for establishing the connection, and of the high force spring 254.1 (shown in FIG. 5) for maintaining the connection of the plug 240 in the socket 230 (shown in FIG. 5).

In other words: in order to move the plug 240 into a possible connecting position, a lower force is required than in the case of the plug-in operation. There are two spring elements 252.1 which press the slide 256 with the plug 240 out of the locked position or the rest position 302 downward in the direction of the socket 230 into the plug-in position 300 (shown in FIGS. 5, 10 and 11).

After the plug 240 has reached the socket 230, the high force spring 254.1 (shown in FIGS. 5 to 7) is activated by way of geometric factors, in particular contours. The high force spring 254.1 interacts with the lever 254.2 (shown in FIG. 7), in order to generate or bring about the required force for pushing the plug 240, in particular the positioning pins 246, into the socket 230.

In order to provide a tolerance compensation in order to compensate for tolerances, in particular component tolerances, while the vehicle seat 100, the seat group 210 or the seat bench 212 is mounted on or in the vehicle 200 and while the vehicle seat 100, the seat group 210 or the seat bench 212 is in use, for example in the installed state during a journey of the vehicle 200, a plurality of plays 258 (also called a tolerance gap) are provided between the plug 240 and the slide 256 and/or between the slide 256 and the housing 248.

In other words: the plug-in connector 224 consisting of the plug-in unit 222 and the socket 230 affords the possibility of compensating for tolerances between the vehicle seat 100, the seat group 210 or the seat bench 212 and the upper rail 114 during the mounting of the vehicle seat 100, the seat group 210 or the seat bench 212 and, moreover, of compensating for additional tolerances on account of relative movements of the vehicle seat 100, the seat group 210 or the seat bench 212 with respect to the upper rail 114 and/or the vehicle 200, for example, the lateral loads, forward movements and rearward movements.

The plug-in connector 224 is configured to make a free movement (gaps in the form of a play 258) between the plug 240 and the slide 256 and/or the housing 248 possible without additional loading of the electrical contacts.

To this end, the plug 240 has the at least two positioning pins 246 which have a cone which matches up with the counter-contour in the socket 230. This plug 240 is capable of compensating for the deviation of, for example, 2 mm in all directions. The maximum tolerance compensation can be adjusted via the magnitude of the dimension of the respective positioning pin 246. When the plug 240 is plugged completely into the socket 230, the plug 240 is given more play 258, on account of the geometric factors, and therefore additional relative movements between the plug 240 which is plugged into the socket 230 and therefore coupled and held electrically by way of the positioning pins 246 and the terminal contacts 242 which are configured as electrical pins.

The tolerance compensation in the vertical direction z takes place by way of the vertical movement of the plug 240 and the slide 256 within the housing 248. The plug-in connector 224 allows it to be possible for the plug 240 to lie at least 2 mm lower, for example. As a result of this vertical tolerance compensation, an electrical connection can be ensured even in the case of a crash.

The spring 250.3 which is configured as a preloading spring is articulated firstly on the housing 248 or a pivot bearing 250.4 for the locking element 250.1 and secondly on the locking element 250.1.

The connecting operation is described in the following text:

There are three different phases, in which the slide 256 together with the plug 240 moves downward out of the locked position or rest position 302 and, after being released, transfers into the completely connected position or plug-in position 300.

Phase 1: Advance (Also Called Drive)

The slide 256 and the plug 240 leave the parked position or rest position 302 after triggering of the triggering unit 250, in particular unlocking of the locking elements 250.1 out of blocking openings 256.1 in the slide 256. The housing 248 is configured in such a way that both the slide 256 and the plug 240 are guidable or are guided tightly in the housing 248 after the release.

For example, the housing 248 has, as a part of the guide device 264, a first inner constriction 248.1 for an upper plug end 240.1 which is remote from the contact and a second inner constriction 248.2 for a contact-facing, lower plug end 240.2. The plug 240 is therefore guided downward in the housing 248 until the plug 240 is at a certain spacing from the socket 230.

The upper plug end 240.1 is configured as a guide pin.

In this phase, the spring elements 252.1 press the plug 240 downward with a small force until the high force spring 254.1 (shown in FIGS. 5 to 7) assumes the function with a high force.

In the first phase (also called the guided phase), the upper plug end 240.1 which is configured as a guide pin or cone is guided in the first inner constriction 248.1 through the housing 248.

A following second phase (also called adjustment finding or adjustment phase) comes into effect, just before the positioning pins 246 dip into the matching bores in the socket 230. Here, the upper plug end 240.1 has left the first inner constriction 248.1 and, as a result, is given a greater play 258 in the housing 248. As a result, the plug 240 can find the correct position relative to the socket 230.

The positioning pins 246 then guide the plug 240 in the correct direction. In this adjustment phase, the high force spring 254.1 assumes the function of driving the slide 256. In the second phase, the plug 240 is largely unguided; it is freely movable.

The third phase is the connecting phase or contacting phase.

The plug 240, in particular its terminal contacts 242, is plugged into the socket 230. By way of the positioning pins 246, the plug 240 is pushed and guided in the correct direction, with the result that the electrical pins or terminal contacts 242 find the counterpart, the contact counter-elements 244 (shown in FIG. 5) in the socket 230 without damage. In this third phase, the high force spring 254.1 presses the plug 240 into the socket 230.

In order to disconnect the electrical connection and therefore the plug 240 from the socket 230, the plug-in unit 222 is coupled to the seat locking means 214.

The plug 240 is removed automatically from the socket 230 and decoupled from the latter when the user releases the mechanical seat locking means 214 between the vehicle seat 100, the seat group 210 or the seat bench 212 and the vehicle 200, in particular between the upper rail 114 and the lower rail 116. The plug 240 provides, for example, a mechanical interface, in particular the lever 254.2 (shown in FIG. 7) which is also actuated upon actuation of the seat locking means 214 and lifts the plug 240 and therefore releases it from the socket 230, for example when the user of the vehicle seat 100, the seat group 210 or the seat bench 212 wishes to remove the latter from the vehicle 200. The coupling of the seat locking means 214 and the lever 254.2 is configured in such a way that it is ensured that the plug 240 is removed completely from the socket 230 before the fastening mechanism which is configured as a claw fastening means releases the vehicle seat 100, the seat group 210 or the seat bench 212 from the upper rail 114.

When the plug 240 is pulled out of the socket 230 and moved into the housing 248 of the plug-in connector 224, the upper plug end 240.1 finds its original locking position independently of the tolerance situation between the vehicle seat 100, the seat group 210 or the seat bench 212 and the vehicle 200, in particular the upper rail 114, and is guided into the first inner constriction 248.1 of the housing 248.

When the plug 240, in particular the upper plug end 240.1, is moved back into the original parked position or rest position 302, the housing 248 gives the cone or upper plug end 240.1 the corresponding shape, in order to be guided into the original parked position or rest position 302. On account of this first inner constriction 248.1, the plug 240 moves back into the starting position or rest position 302, and the spring-loaded locking elements 250.1 pivot automatically into the blocking openings 256.1. The plug 240 is again locked in the rest position 302. The plug 240 can be unlocked again automatically from this blocked or locked rest position 302 by way of actuation of the seat locking means 214 when the vehicle seat 100, the seat group 210 or the seat bench 212 is mounted again in the vehicle 200.

During this movement of the plug 240 back into the starting position or rest position 302, the slide 256 correspondingly moves back to the plug 240, with the result that the slide 256 is caught by the locking elements 250.1 by the latter dipping into the blocking openings 256.1 of the slide 256.

Figure 9:
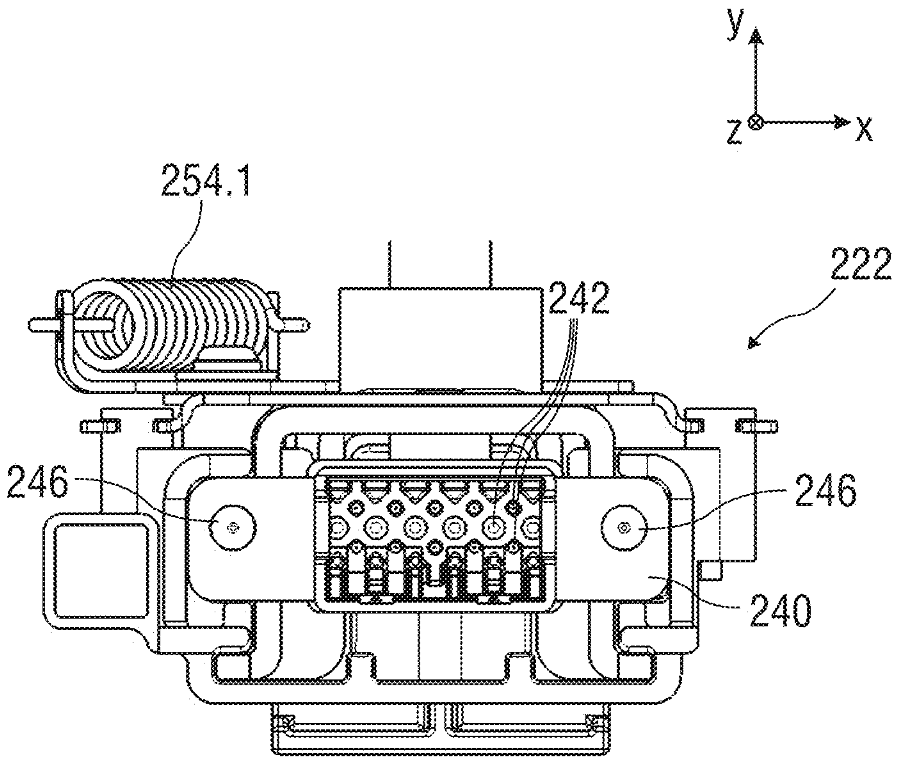
FIG. 9 shows the plug-in unit according to FIG. 7 in a view from below, FIG. 10 diagrammatically shows a side view of the plug-in unit in a plug-in position, FIG. 11 diagrammatically shows a sectional illustration of the plug-in unit according to FIG. 10, FIG. 12 diagrammatically shows a perspective illustration of the plug-in unit with an alternative locking element in a locking position or blocking position and with an electrical interface, FIG. 13 diagrammatically shows a perspective illustration of the plug-in unit according to FIG. 12 with the alternative locking element in a plug-in position or release position, FIG. 14 diagrammatically shows a side view of the plug-in unit with the electrical interface and the alternative locking element in the locking position according to FIG. 12, and FIG. 15 diagrammatically shows a sectional illustration of the plug-in unit according to FIG. 14.

FIG. 9 shows the plug-in unit 222 in a view from below. The plug 240 has a plurality of terminal contacts 242. The positioning pins 246 are arranged laterally next to the terminal contacts 242. The positioning pins 246 have greater dimensions, both in length and in width, than the terminal contacts 242.

FIG. 10 shows a side view of the plug-in unit 222 in the plug-in position 300. FIG. 11 shows a sectional illustration of the plug-in unit 222 in the plug-in position 300.

The plug 240 is moved partially out of the housing 248. The spring elements 252.1 are relieved. The high force spring 254.1 presses by means of the lever 254.2 on the slide 256 and therefore the plug 240, in order to hold the latter plugged into the socket 230 in the plug-in position 300.

The plug 240 is arranged and held in the slide 256 with play 258.

Figure 12:
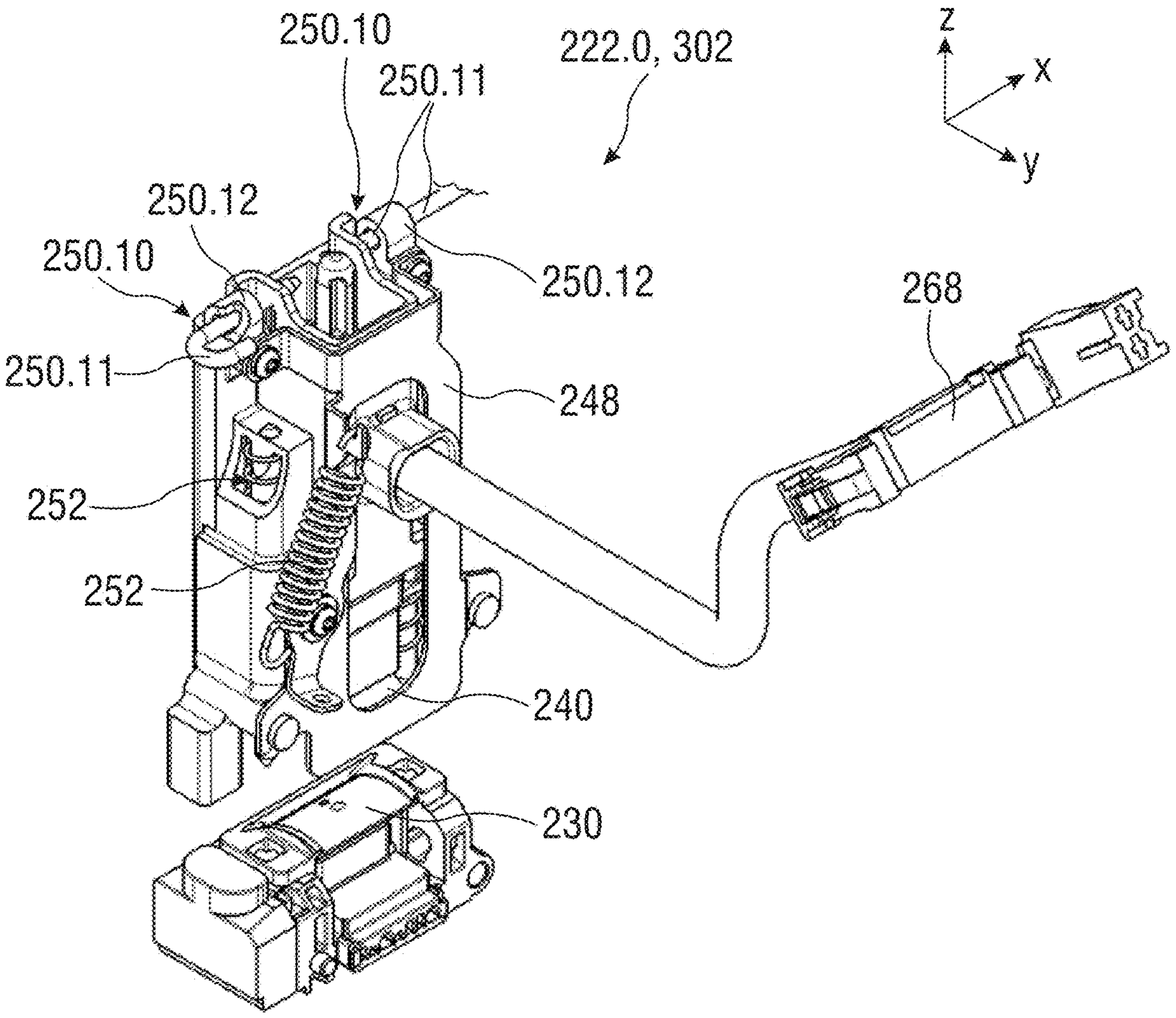

FIG. 12 diagrammatically shows a perspective illustration of an alternative plug-in unit 222.0 in the blocking position or rest position 302. The alternative plug-in unit 222.0 differs from the above-described plug-in unit 222 merely in terms of an alternative locking element 250.10.

Instead of eccentrics, as shown in FIGS. 5 to 8, 10 and 11, the respective locking element 250.10 is configured as a locking pin 250.11.

The alternative locking element 250.10 is mounted movably on the housing 248, in particular linearly movably. The alternative locking element 250.10 blocks the drive unit 252 in a first position and holds the plug 240 in its rest position 302. In a second position, the locking elements 250.10 unblock the drive unit 252, in order to adjust the plug 240 out of the rest position 302 (shown in FIGS. 12, 14 and 15) into the plug-in position 300 into the socket 230 (shown in FIG. 13).

For locking of the drive unit 252, for example, the locking openings or blocking openings 256.1 can be provided in the slide 256 (also called a carriage) per locking pin 250.11.

In order to actuate the locking pins 250.11 into the rest position 302, these locking pins 250.11 can be actuable or movable, in particular linearly adjustable or actuable in a controlled manner, for example into the rest position 302 by a mechanical locking system (not shown) which is operatively connected to the locking pins 250.11.

The alternative plug-in unit 222.0 can comprise two locking pins 250.11 which lie opposite one another and are movable toward one another or away from one another synchronously. The locking pins 250.11 are configured, for example, as a pin, a bolt, a U-shaped profile, an L-shaped profile or the like. At the upper housing end which, in particular, faces away from the plug, the housing 248 comprises two pin-type bearings 250.12, in which the respective locking pin 250.11 is mounted captively and linearly movably.

Furthermore, in this FIG. 12, an electrical interface 268 for contacting the alternative plug-in unit 222 with a current supply, the control unit and/or other electrical components is provided.

Figure 13:
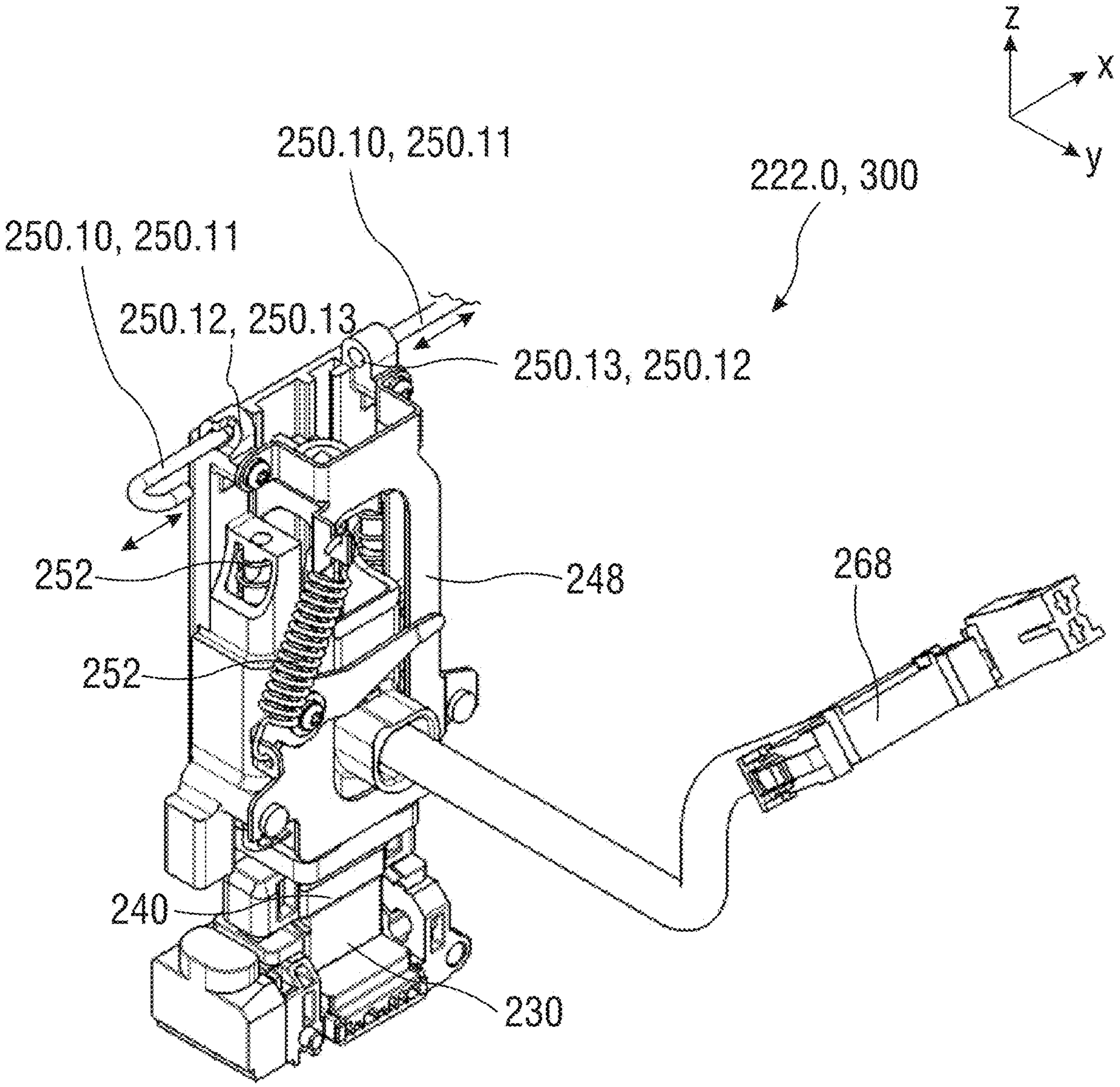
Figure 14:
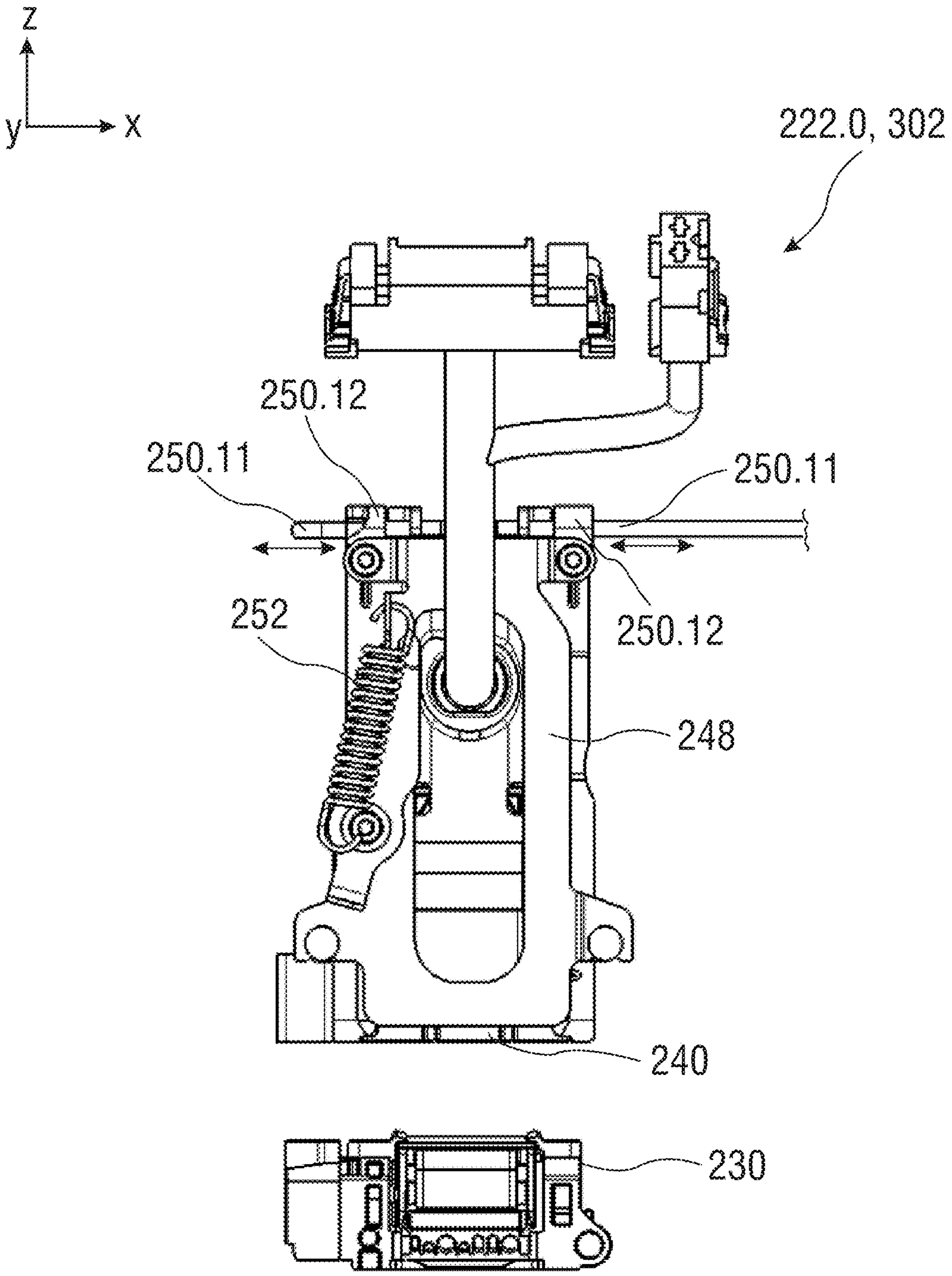
Figure 15:
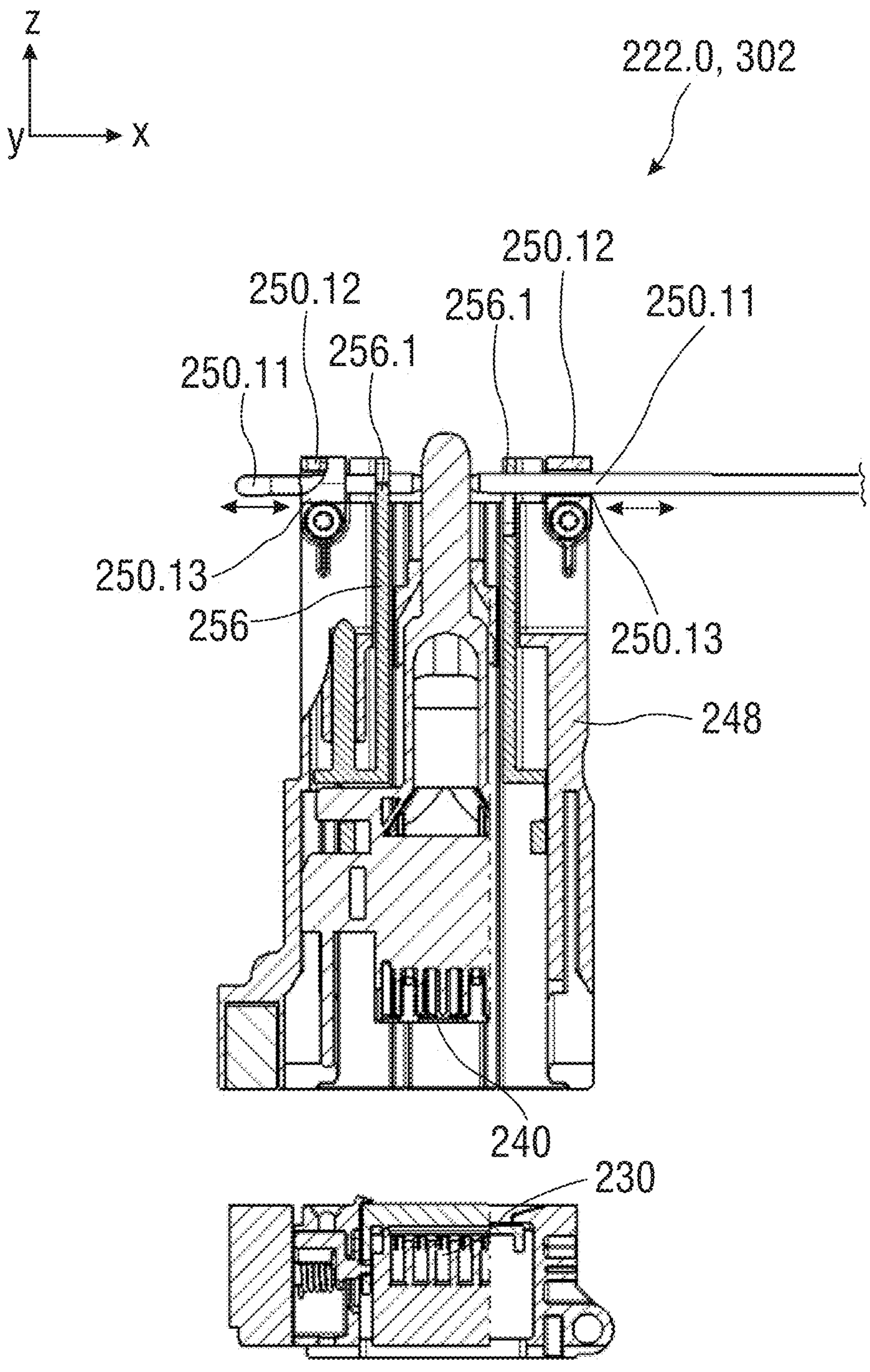

FIG. 13 diagrammatically shows a perspective illustration of the alternative plug-in unit 222.0 according to FIG. 12 with the alternative locking element 250.10, but in the plug-in position 300 (also called the blocking position or locking position). FIG. 14 diagrammatically shows a side view of the alternative plug-in unit 222.0 with the alternative locking element 250.10 in the rest position 302 according to FIG. 12, and FIG. 15 diagrammatically shows a sectional illustration of the alternative plug-in unit 222.0 according to FIG. 14.

The locking pins 250.11 are configured, for example, as L-shaped pins. The pin-type bearing 250.12 is configured, in particular, as a hollow-cylindrical bearing bush 250.13.

The function and the locking movement or the plug-in movement are also carried out in the case of the alternative plug-in unit 222.0 analogously to that described in respect of the plug-in unit 222.

LIST OF DESIGNATIONS

100 Vehicle seat, seat
102 Seat part
104 Backrest
106 Fitting
108 Rotational axis
110 Longitudinal adjustment device
112 Rail arrangement
114 First rail element (upper rail)
116 Second rail element (lower rail)
118 Rail pair
120 Fastening region
122 Sensor
200 Vehicle
201 Seat arrangement
202 Second seat row
204 Third seat row
206 Floor region
208 Seat surface

210 Seat group
212 Seat bench
214 Seat locking means
220 Contacting region
222 Plug-in unit
222.0 Alternative plug-in unit
222.1 Mounting module
224 Plug-in connector
226 Dummy
228 Counter-contacting region
230 Socket
232 Cable cartridge
234 Cable
236 Control unit
238 Contacting apparatus
240 Plug
240.1 Upper plug end
240.2 Lower plug end
242 Terminal contact
244 Contacting counter-element
246 Positioning pin
248 Housing
248.1 First inner constriction
248.2 Second inner constriction
250 Triggering unit
250.1 Locking element
250.10 Alternative locking element
250.11 Locking pin
250.12 Pin-type bearing
250.13 Bearing bush
250.2 Blocking portion
250.3 Spring
250.4 Pivot bearing
252 Drive unit
252.1 Spring element
254 Restoring unit
254.1 High force spring
254.2 Lever
256 Slide
256.1 Blocking opening
258 Play
260 Magnet element
262 Position opening
264 Guide device
266 Dust cover
268 Electrical interface
300 Plug-in position (unlocking/release position)
302 Rest position (blocking/locking position)
x Longitudinal direction
y Transverse direction
z Vertical direction

The invention claimed is:

1. A plug-in unit for a plug-in connector, comprising:

a housing, a plug with a number of plug-in contacts, a triggering unit which is mounted movably on the housing, and a drive unit, the triggering unit unblocking or releasing the drive unit upon triggering, with a result that the plug, driven by the drive unit, is movable relative to the housing from a rest position into a plug-in position, wherein the triggering unit comprises at least one locking element having a locking portion that, in a first position of the locking element, engages in a locking opening of a slide in a locking manner.

2. The plug-in unit as claimed in claim 1, wherein the plug-in unit is configured as a mounting module.

3. The plug-in unit as claimed in claim 1, the triggering unit being mounted pivotably at an upper end of the housing.

4. The plug-in unit as claimed in claim 1, wherein the at least one locking element is movable and blocks, in a first position, the drive unit and holds the plug in the rest position, and unblocks in a second position the drive unit to adjust the plug out of the rest position into the plug-in position.

5. The plug-in unit as claimed in claim 4, the locking element being mounted on the housing pivotably about a pivot axis or linearly movably.

6. The plug-in unit as claimed in claim 4, wherein the locking element is configured as an unlocking eccentric cam or as a locking pin.

7. The plug-in unit as claimed in claim 4, wherein the locking element is fixable in a predefined rotary angle position by a spring.

8. The plug-in unit as claimed in claim 4, wherein the locking element comprises a blocking portion which, in the first position of the locking element, engages in a blocking manner into a blocking opening of the slide.

9. The plug-in unit as claimed in claim 1, wherein the slide is movement-coupled to the drive unit.

10. The plug-in unit as claimed in claim 1, wherein the slide is mounted and guided movably in the housing.

11. The plug-in unit as claimed in claim 10, wherein the plug is supported on the slide or is held by the latter and being mounted and guided movably in the housing by way of the slide.

12. A plug-in connector, comprising the plug-in unit as claimed in claim 1 and a socket which is complementary with respect to the plug-in unit, the plug making contact automatically with the socket during a movement into the plug-in position.

13. The plug-in unit as claimed in claim 1, wherein the slide is an intermediate carriage that is movably guided in the housing, and the plug is fixed to the slide.

14. The plug-in unit as claimed in claim 1, wherein the locking mechanism interacts with the slide without direct contact between the plug and the locking mechanism.

15. A seat arrangement with at least one seat, a seat group and/or a seat bench, wherein the seat, the seat group or the seat bench each comprising at least one of the plug-in units, which comprises:

a housing, a plug with a number of plug-in contacts, a triggering unit which is mounted movably on the housing, and a drive unit, wherein the triggering unit comprises at least one locking element having a locking portion that, in a first position of the locking element, engages in a locking opening of a slide in a locking manner, wherein the slide is an intermediate carriage that is movably guided in the housing, and the plug is fixed to the slide, wherein the two plug-in units are mounted such that the seat, the seat assembly, or the bench seat can each be mounted in different orientations and can be connected to a complementary socket by means of one of the plug-in units.

16. The seat arrangement as claimed in claim 15, the seat, the seat group or the seat bench comprising in each case two plug-in units which are mounted in such a way that the seat, the seat group or the seat bench is couplable by one of the plug-in units to a complementary socket.

17. A vehicle with the seat arrangement as claimed in claim 15.

* * * * *